United States Patent
Abedini et al.

(10) Patent No.: US 12,289,264 B2
(45) Date of Patent: Apr. 29, 2025

(54) NETWORK ENERGY SAVINGS AND UPLINK REPETITION

(71) Applicant: QUALCOMM Incorporated, San Diego, CA (US)

(72) Inventors: Navid Abedini, Basking Ridge, NJ (US); Mahmoud Taherzadeh Boroujeni, San Diego, CA (US); Muhammad Nazmul Islam, Littleton, MA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/808,470

(22) Filed: Jun. 23, 2022

(65) Prior Publication Data

US 2023/0421321 A1    Dec. 28, 2023

(51) Int. Cl.
*H04L 5/00* (2006.01)
*H04L 1/08* (2006.01)

(52) U.S. Cl.
CPC .............. *H04L 5/0048* (2013.01); *H04L 1/08* (2013.01)

(58) Field of Classification Search
CPC ....................................................... H04L 1/08
See application file for complete search history.

(56) References Cited

U.S. PATENT DOCUMENTS

| 2016/0157251 A1* | 6/2016 | Schliwa-Bertling .... H04W 4/70 370/315 |
| 2024/0179656 A1* | 5/2024 | Chen ..................... H04W 56/00 |
| 2024/0223312 A1* | 7/2024 | Ly ............................. H04L 1/08 |

* cited by examiner

*Primary Examiner* — Michael A Keller
(74) *Attorney, Agent, or Firm* — Arent Fox, LLP

(57) ABSTRACT

Aspects are provided allowing a UE to transmit repetitions of an ULT, PEI-R, or other uplink reference signal for on-demand SSB, RMSI, or paging transmissions. A base station initially transmits an indication of a configured uplink repetition mode, which may comprise a first, second, or third mode in which a one-to-one, one-to-many, or many-to-many mapping exists between downlink reference signals and uplink occasions, respectively. Afterwards, the UE receives downlink reference signals via different transmission beams of the base station. In response to the downlink reference signals, the UE transmits an uplink reference signal repetition in one or more uplink occasions associated with one or more of the downlink reference signals according to the configured uplink repetition mode. In response to the uplink reference signal repetition, the base station may transmit a SSB, RMSI, or paging message. Thus, a balance between network energy savings and uplink signal reliability may be achieved.

30 Claims, 17 Drawing Sheets

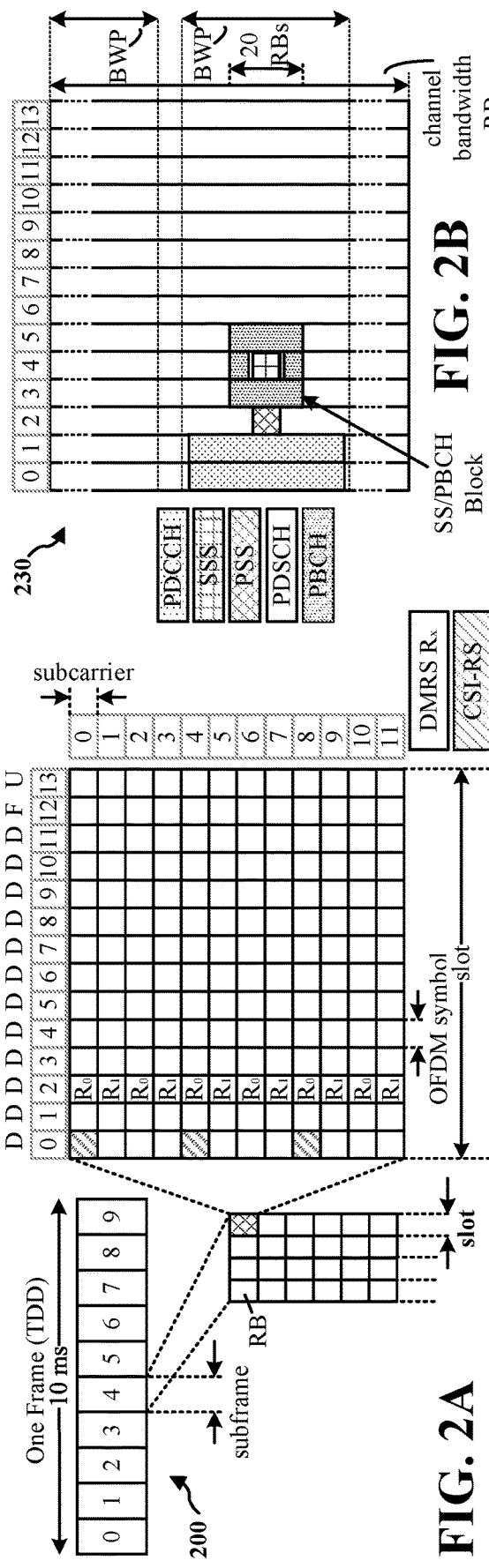
FIG. 2A
FIG. 2B
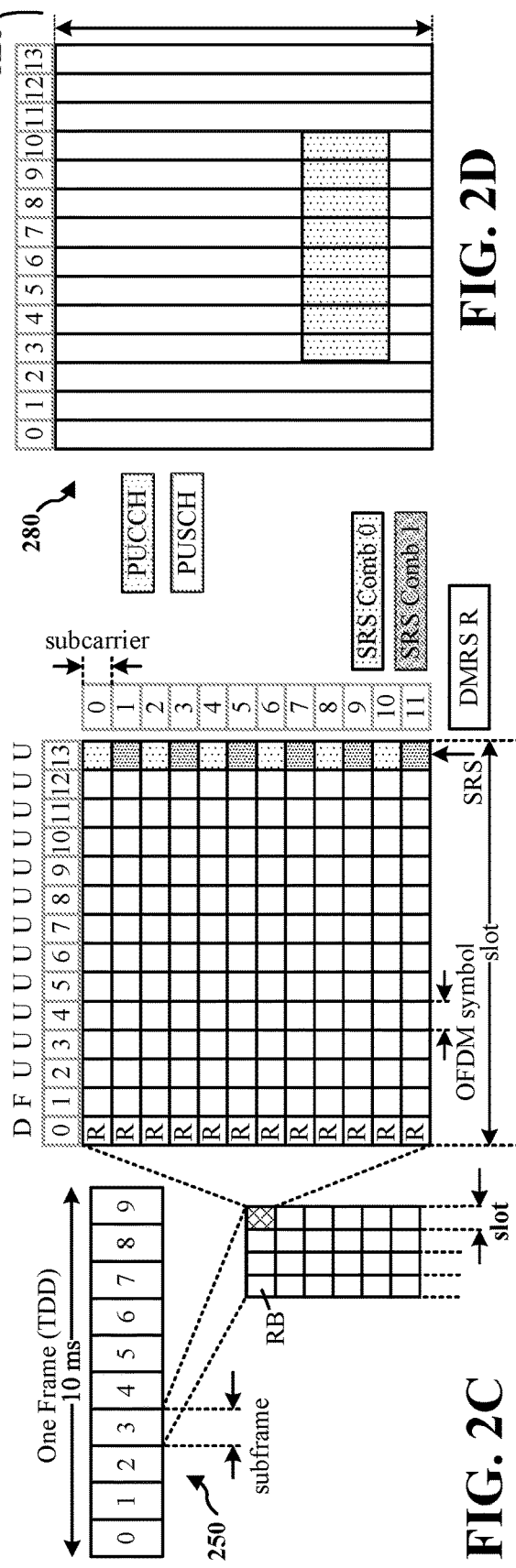
FIG. 2C
FIG. 2D

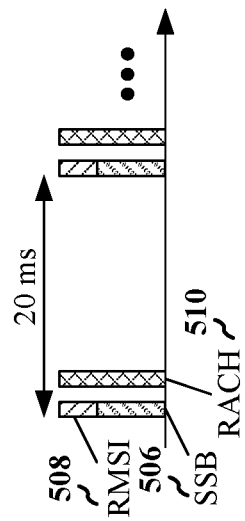
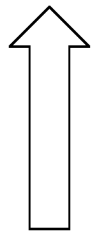
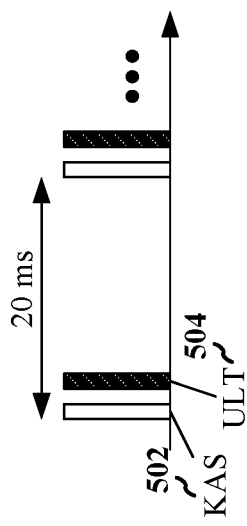
FIG. 5

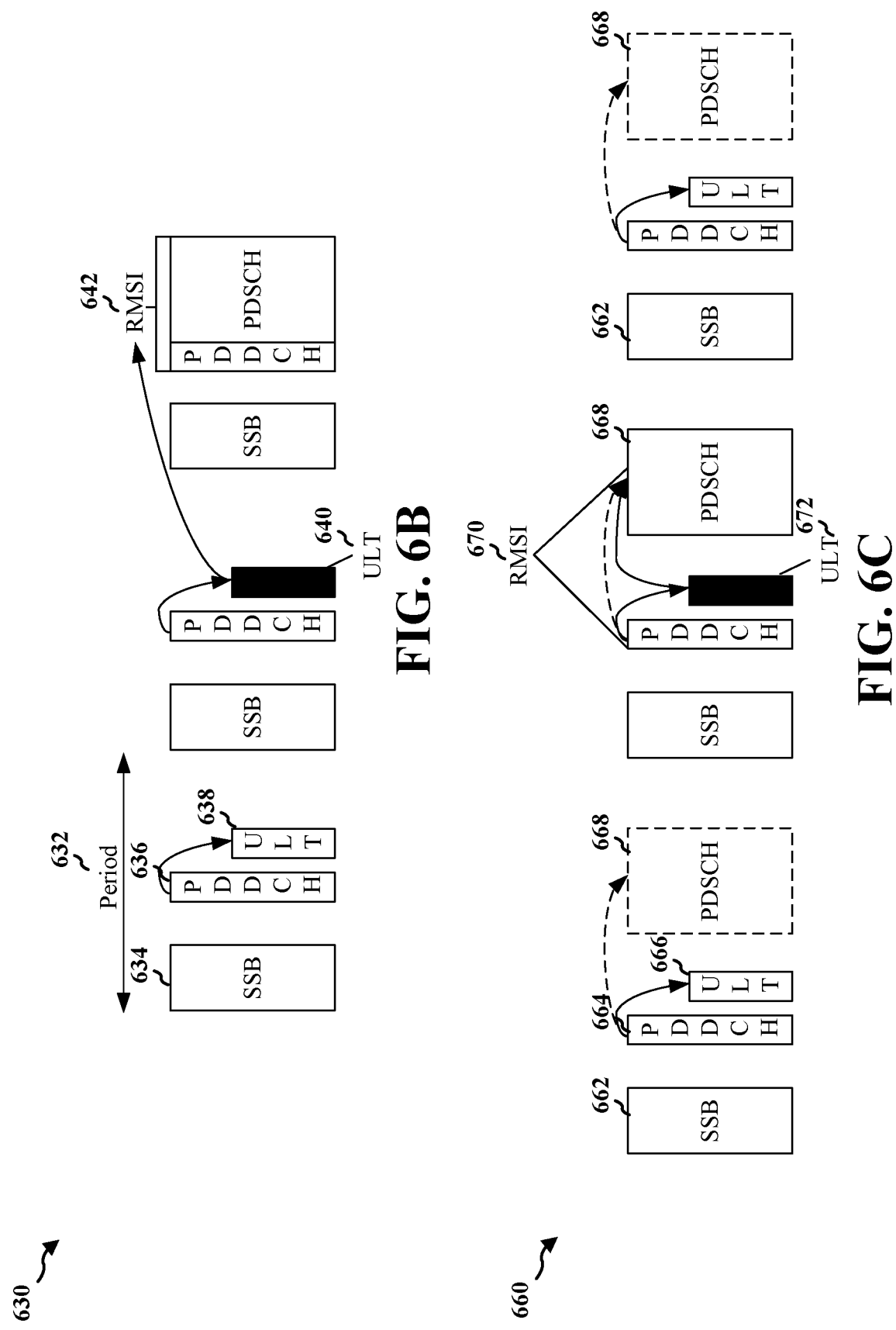

NETWORK ENERGY SAVINGS AND UPLINK REPETITION

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE includes a processor, memory coupled with the processor, and instructions stored in the memory. The instructions are operable, when executed by the processor, to cause the UE to receive a plurality of downlink reference signals via different transmission beams of a base station, to transmit an uplink reference signal repetition in response to an indication of a configured uplink repetition mode, and to receive, in response to the uplink reference signal repetition, a synchronization signal block (SSB), remaining minimum system information (RMSI), or a paging message. The configured uplink repetition mode comprises a first mode in which the downlink reference signals are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition.

In an aspect of the disclosure, a method, a computer-readable medium, and an apparatus are provided. The apparatus may be a base station. The base station includes a processor, memory coupled with the processor, and instructions stored in the memory. The instructions are operable, when executed by the processor, to cause the base station to transmit a plurality of downlink reference signals via different transmission beams, to receive an uplink reference signal repetition in response to an indication of a configured uplink repetition mode, and to transmit, in response to the uplink reference signal repetition, a SSB, RMSI, or a paging message. The configured uplink repetition mode comprises a first mode in which the downlink reference signals are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5 illustrates is a diagram illustrating an example of on-demand SSB transmission.

FIGS. 6A-6C are diagrams illustrating examples of on-demand RMSI transmissions.

DETAILED DESCRIPTION

Figure 1:
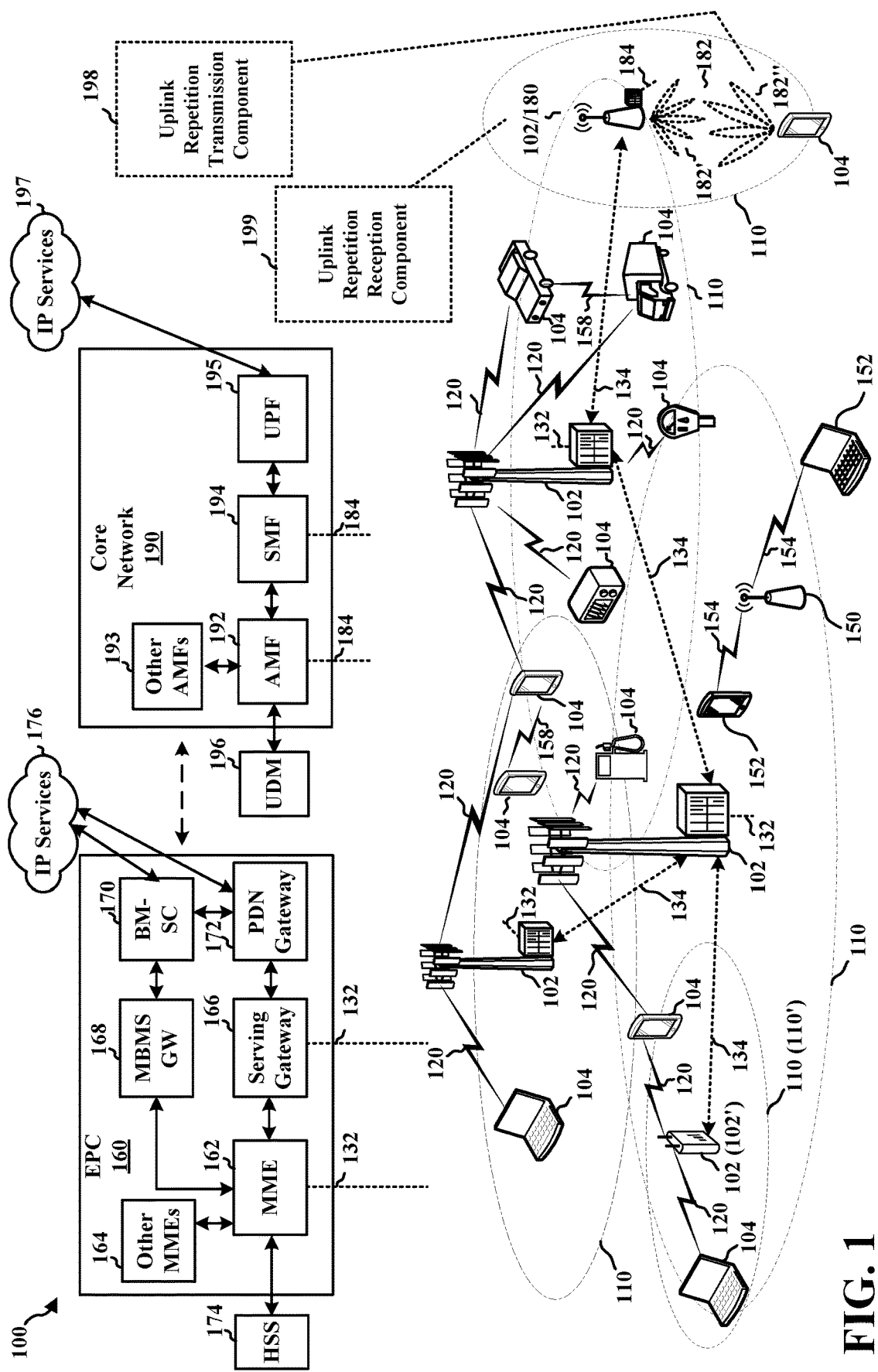
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

During idle, empty, low, or medium load scenarios, the majority of network power consumption is generally attributed to SSB transmission, RMSI transmission, and RACH monitoring for access by potential UEs to the network. Typically, the traffic generated by UEs among carriers and neighbor cells for this purpose may be relatively low. However, periodic recurrence of this activity may still result in sizeable energy consumption or network overhead. Moreover, a sizeable amount of network energy consumption over time may also occur when the base station is discontinuously operating in a sleep mode between performance of initial access activities. Additionally, paging may contribute to the overall energy consumption by the network, since a base station uninformed of the exact location of the UE may end up transmitting a paging message in many directions and potentially on many cells in attempt to reach the UE.

Thus, the base station may experience sizeable, and unnecessary, power consumption or overhead when performing SSB and RMSI transmissions, RACH monitoring, or paging. As a result, in attempt to reduce this power consumption or network overhead, the base station may transmit SSBs and RMSI, or monitor for RACH transmissions, on-demand. For example, instead of constantly sending SSBs and RMSIs or monitoring for RACH transmissions on a periodic basis, the base station may periodically transmit reference signals to the UE which are each associated with an uplink occasion. These downlink reference signals may be, for example, keep alive signals, paging early indicators, signals in PDCCH, and the like. During the time these reference signals are transmitted, SSB and RMSI transmissions, RACH monitoring, or paging may initially be deactivated. Later, if the base station receives a reference signal from the UE (e.g., an uplink trigger or a paging early indicator response) in one of the uplink occasions associated with these downlink reference signals, the base station may be triggered to activate the SSB and RMSI transmissions, RACH monitoring, or paging accordingly.

However, even though the base station may save network energy by performing initial access activities on-demand in response to an uplink reference signal from a UE, there is still a possibility that the uplink reference signal may not be reliably detected by the base station. For example, if the signal quality of an uplink trigger is poor (e.g., due to path loss between the UE and the base station), the base station may not be able to successfully decode the uplink trigger. As a result, the base station may not activate on-demand transmission of an SSB, RMSI, or paging message (or activate on-demand monitoring of RACH preambles from the UE), and thus the UE may not be able to access the network.

Therefore, to improve reliability of uplink reference signals for on-demand SSB, RMSI, or paging transmissions, the base station may configure the UE to periodically transmit at least one repetition of such uplink reference signal. For instance, the UE may transmit multiple uplink reference signals in uplink occasions associated with different transmission beams of different downlink reference signals, in uplink occasions associated with a same transmission beam of a same downlink reference signal, or a combination of the foregoing, in order to improve reliability of the uplink reference signal and thus the likelihood that the base station will successfully decode the signal and subsequently activate an on-demand transmission. Nevertheless, while allowing the UE to send repetitions of an uplink reference signal in occasions associated with one or multiple beam directions may result in improved signal reliability for on-demand SSB, RMSI, or paging activation, unconditionally allowing such repetitions to occur may not necessarily be power-efficient or link-efficient. Therefore, it would be helpful to impose conditions on these repetitions to prevent an unnecessary amount of network energy consumption or overhead at the base station.

Accordingly, aspects are provided for achieving a balance between network energy savings and uplink reference signal reliability or diversity for on-demand SSB, RMSI, or paging message activation. Initially, a base station may configure rules for a UE to follow when transmitting repetitions of an uplink reference signal in uplink occasions occurring at different times. Moreover, the uplink occasions may be associated with downlink reference signals or transmission beams of the base station in different ways. In one example, a one-to-one mapping may exist between downlink reference signals and uplink occasions (e.g., uplink occasions are associated with different transmission beams of the base station). In another example, a one-to-many mapping may exist between a downlink reference signal and the uplink occasions (e.g., uplink occasions are associated with a same transmission beam of the base station). In a further example, multiple mappings may exist between downlink reference signals and uplink occasions (e.g., one set of uplink occasions is associated with one beam, another set of uplink occasions is associated with a different beam, etc.). The base station may configure these rules, mappings, and other related parameters semi-statically or dynamically. In any example, if the UE receives one or more of these downlink reference signals via one or more transmission beams of the base station, the UE may measure an RSRP of each received reference signal and compare the RSRPs against one or more configured thresholds. Based on the measurements and configured rules applying these thresholds, the UE may transmit repetition(s) of the uplink reference signal to the base station in one or more of the uplink occasions. In response to receiving the repetition(s) in the uplink occasion(s), the base station may successfully decode the signal and consequently transmit information such as an SSB, RMSI, or paging message (or monitor for a RACH preamble) in a resource activated by or associated with the uplink reference signal. As a result, the base station may provide on-demand SSBs, RMSI, or paging messages, or perform on-demand RACH monitoring, with improved network energy savings and reliability.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions . The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include an uplink repetition transmission component 198 that may be configured to receive a plurality of downlink reference signals via different transmission beams of a base station, to transmit an uplink reference signal repetition in response to an indication of a configured uplink repetition mode, and to receive, in response to the uplink reference signal repetition, a SSB, RMSI, or a paging message. The configured uplink repetition mode may comprise a first mode in which the downlink reference signals are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition.

Referring again to FIG. 1, in certain aspects, the base station 102/180 may include an uplink repetition reception component 199 that may be configured to transmit a plurality of downlink reference signals via different transmission beams, to receive an uplink reference signal repetition in response to an indication of a configured uplink repetition mode, and to transmit, in response to the uplink reference signal repetition, a SSB, RMSI, or a paging message. The configured uplink repetition mode may comprise a first mode in which the downlink reference signals are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B)

that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
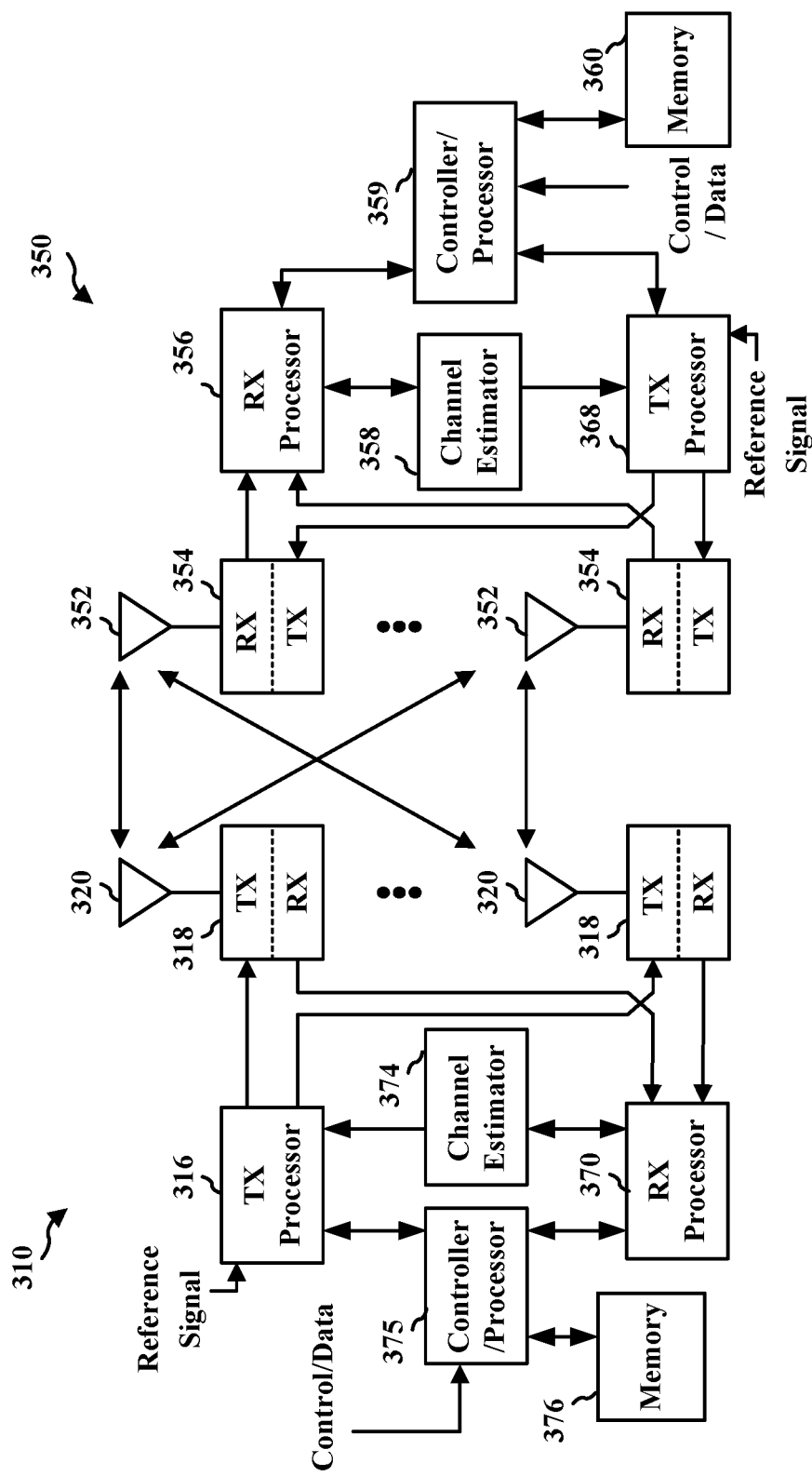
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with uplink repetition transmission component 198 of FIG. 1.

At least one of the TX processor 316, the RX processor 370, and the controller/processor 375 may be configured to perform aspects in connection with uplink repetition reception component 199 of FIG. 1.

During idle, empty, low, or medium load scenarios, the majority of network power consumption is generally attributed to SSB transmission, RMSI transmission, and RACH monitoring for access by potential UEs to the network. Typically, the traffic generated by UEs among carriers and neighbor cells for this purpose may be relatively low. However, periodic recurrence of this activity may still result in sizeable energy consumption or network overhead. Moreover, a sizeable amount of network energy consumption over time may also occur when the base station is discontinuously operating in a sleep mode between performance of initial access activities.

Figure 4B:
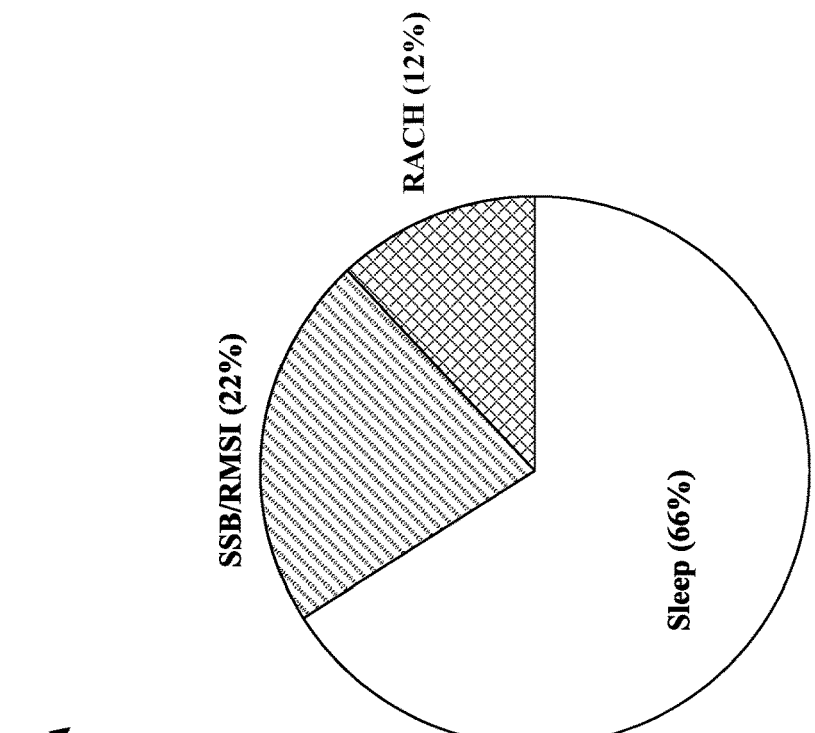
FIGS. 4A and 4B are diagrams illustrating examples of typical power consumption by a base station when transmitting SSBs and RMSI and monitoring a random access channel (RACH) from idle UEs.
Figure 4A:
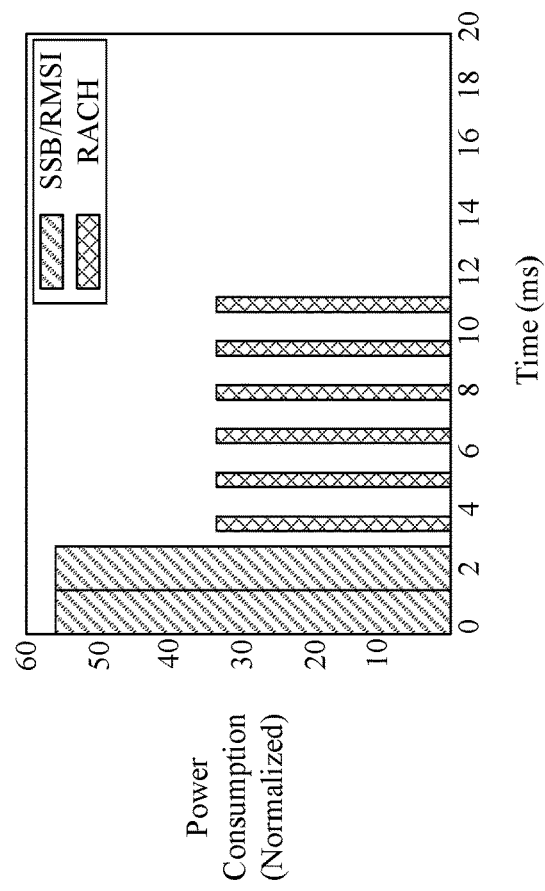

FIGS. 4A and 4B illustrate examples 400, 450 of typical power consumption by a base station when transmitting SSBs and RMSI and monitoring RACH from idle UEs. As an example, if the base station transmits SSBs respectively over 32 transmission beams, transmits RMSI using a SS/PBCH block and CORESET multiplexing pattern 3 (i.e., RMSI pattern '3'), monitors for 4-symbol RACH preambles from the UE, and repeats the aforementioned transmissions and monitoring every 20 ms (i.e., a 20 ms periodicity), the base station may periodically consume a significant amount of power such as illustrated in FIG. 4A. This power consumption may be divided between SSB/RMSI and RACH such as illustrated in FIGS. 4A and 4B. For example, 22% of network power consumption every 20 ms may be attributed to SSB and RMSI transmissions, while 12% of network power consumption every 20 ms may be attributed to RACH monitoring, as illustrated in FIG. 4B. Additionally, the base station may consume an even larger amount of power when discontinuously operating in a deep sleep mode, such as 66% of the total network power consumption as illustrated in FIG. 4B.

Additionally, paging may contribute to the overall energy consumption by the network. For instance, an idle or inactive UE which is not connected to the network may still move throughout the network freely and thus the base station may end up blindly paging the UE in many directions and potentially on many cells. For example, if downlink traffic is intended for that UE, the base station may not know the exact location of the UE (e.g., the cell on which the UE is camping, or the spatial direction of the UE especially in higher frequency bands such as FR2 in mmW environments). As a result, the base station may end up transmitting a paging message in many directions and potentially on many cells in attempt to reach the UE.

Thus, the base station may experience sizeable, and unnecessary, power consumption or overhead when performing SSB and RMSI transmissions, RACH monitoring, or paging. As a result, in attempt to reduce this power consumption or network overhead, the base station may transmit SSBs and RMSI, or monitor for RACH transmissions, on-demand. For example, instead of constantly sending SSBs and RMSIs or monitoring for RACH transmissions on a periodic basis, the base station may periodically transmit reference signals to the UE which are each associated with an uplink trigger (ULT) occasion. SSB and RMSI transmissions, RACH monitoring, or paging may initially be deactivated during this time. If the base station receives an uplink trigger (e.g., a reference signal) from the UE in an ULT occasion, the base station may be triggered to activate the SSB and RMSI transmissions, RACH monitoring, or paging accordingly.

FIG. 5 illustrates an example 500 of on-demand SSB transmission. Initially, the base station may transmit a discovery signal or reference signal, in this example referred to as a keep alive signal (KAS 502), which may include limited information indicating the existence of the base station or its cell. If the UE is interested in accessing this cell or acquiring more information from the base station, the UE may send an uplink reference signal, here referred to as an uplink trigger (ULT 504), in a pre-configured, time-frequency resource associated with the KAS. In this example, the ULT may include a same format as a RACH preamble, although the format may be different in other examples. The base station may transmit KASs 502 periodically (e.g., every 20 ms) in a transmission beam sweep (e.g., over transmission beams in different directions) while monitoring for associated ULTs. In response to receiving ULT 504 from the UE, the base station may activate its SSB/RMSI transmissions and perform RACH monitoring for that cell. For instance, the base station may transmit an SSB 506 to the UE, a RMSI 508 associated with the SSB to the UE, and monitor a RACH occasion for a RACH preamble 510 from the UE, periodically (e.g., every 20 ms).

Figure 6A:
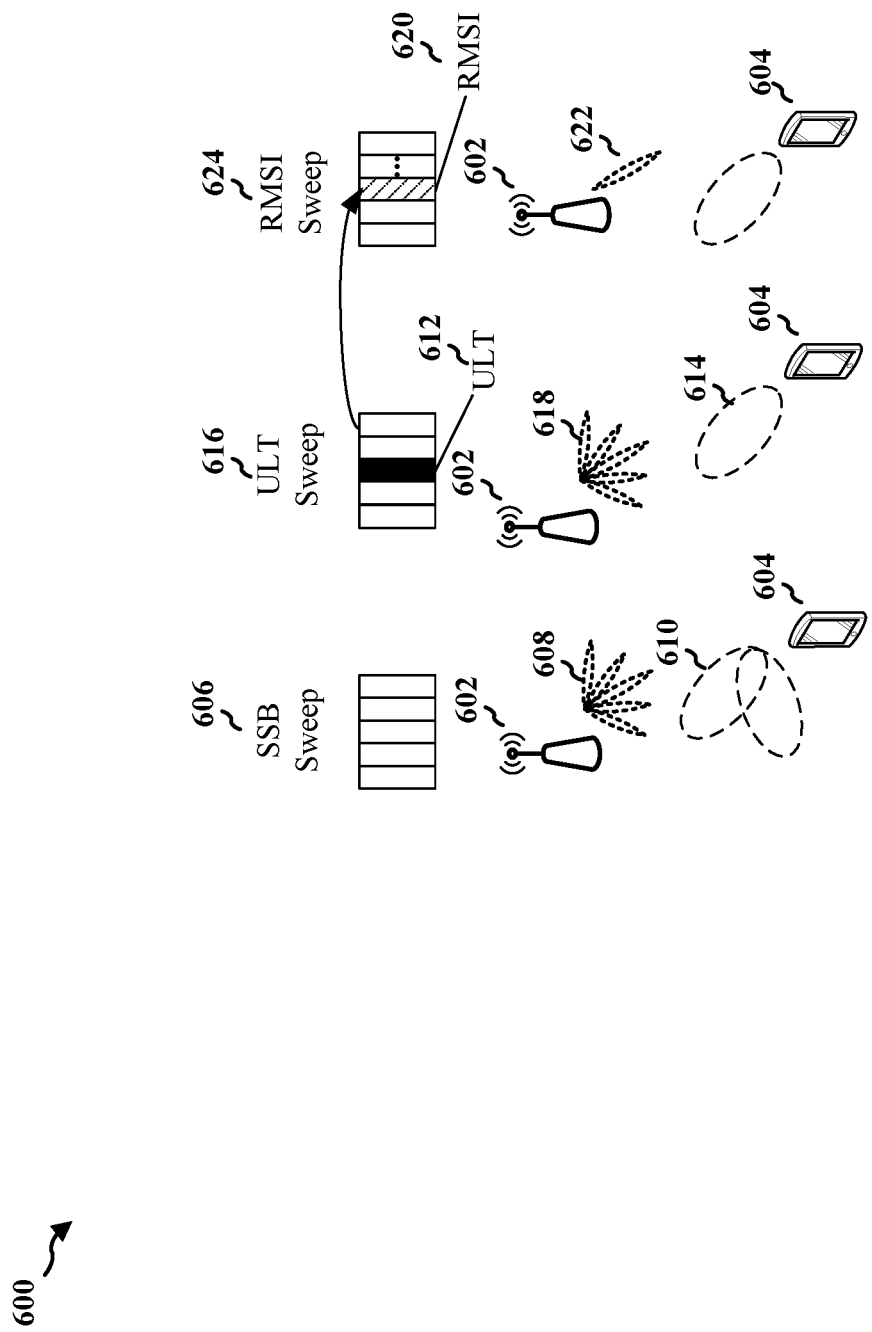

FIGS. 6A-6C illustrate examples 600, 630, 660 of on-demand RMSI transmissions. In contrast to the example of FIG. 5, in these examples the base station constantly transmits SSBs on a periodic basis notwithstanding energy consumption. Therefore, in order to save power, the base station may activate an RMSI transmission on-demand in response to detection of an uplink trigger from a UE in a monitoring occasion.

Referring to FIG. 6A, in one example, a base station 602 may transmit RMSI to a UE 604 in response to receiving an uplink trigger in pre-configured, time-frequency resources. Initially, the base station 602 may perform an SSB beam sweep 606, in which the base station transmits SSBs respectively over different transmission beams 608 to the UE 604. The UE 604, in turn, may monitor for SSBs respectively over different reception beams 610. If the UE 604 receives an SSB in one of its reception beams 610, the UE may transmit a ULT 612 via a transmission beam 614 in one of multiple time-frequency resources or ULT occasions respectively associated with the SSBs. For instance, in the illustrated example 600, the UE 604 may transmit the ULT 612 in the third time-frequency resource or ULT occasion. During this time, the base station 602 may perform a ULT sweep 616, in which the base station monitors for ULTs respectively over different reception beams 618. In response to receiving the ULT 612 in a respective ULT occasion via one of its reception beams 618, the base station 602 may transmit RMSI 620 via a corresponding transmission beam 622 in a corresponding time-frequency resource or occasion associated with the respective ULT occasion. For instance, in the illustrated example 600, the base station 602 may transmit RMSI 620 in the third time-frequency resource associated with the third ULT occasion. The UE 604 may receive the RMSI 620, for example, in response to performing a RMSI sweep 624 during which the UE may monitor for RMSIs respectively in the different configured occasions.

Referring to FIGS. 6B and 6C, in various examples, the base station may transmit RMSI to the UE in PDSCH resources scheduled by a PDCCH (e.g., a control resource set (CORESET 0)) in response to receiving an uplink trigger in dynamically scheduled time-frequency resources or ULT occasions. In the example 630 of FIG. 6B, during a period 632 for SSB transmission, the base station initially transmits a SSB 634 which is associated with a PDCCH 636. For example, the SSB 634 may include a MIB which indicates a CORESET 0 and a search space for PDCCH 636. The PDCCH 636 in turn, may schedule time-frequency resources for an uplink trigger, or an ULT occasion 638, in which the UE may transmit a ULT 640 to activate a RMSI transmission. The base station may continue to monitor ULT occasions 638 associated with SSBs 634 (via respective PDCCHs 636) until ULT 640 is detected. In response to receiving the ULT 640, the base station may transmit RMSI 642 in the next PDSCH occasion or time-frequency resources scheduled by a subsequent PDCCH associated with a following SSB. Similarly, in the example 660 of FIG. 6C, the base station may transmit SSBs 662 respectively associated with PDCCHs 664 which grant resources for respective ULT occasions 666. However, unlike the example of FIG. 6B where the base station dynamically schedules PDSCH resources via a subsequent PDCCH for RMSI in response to receiving an ULT, in the example of FIG. 6C, the PDCCHs 664 respectively schedule time-frequency resources for PDSCH 668 which conditionally carry RMSI 670 if an ULT 672 associated with the same PDCCH has been received. For example, if the base station does not receive ULT 672 in an ULT occasion associated with a respective PDCCH, the base station does not transmit RMSI in the PDSCH 668 already scheduled by the respective PDCCH, but if the base station does receive ULT 672 in an ULT occasion associated with the respective PDCCH 664, the base station transmits RMSI in the PDSCH 668 previously scheduled by the respective PDCCH.

Figure 7:
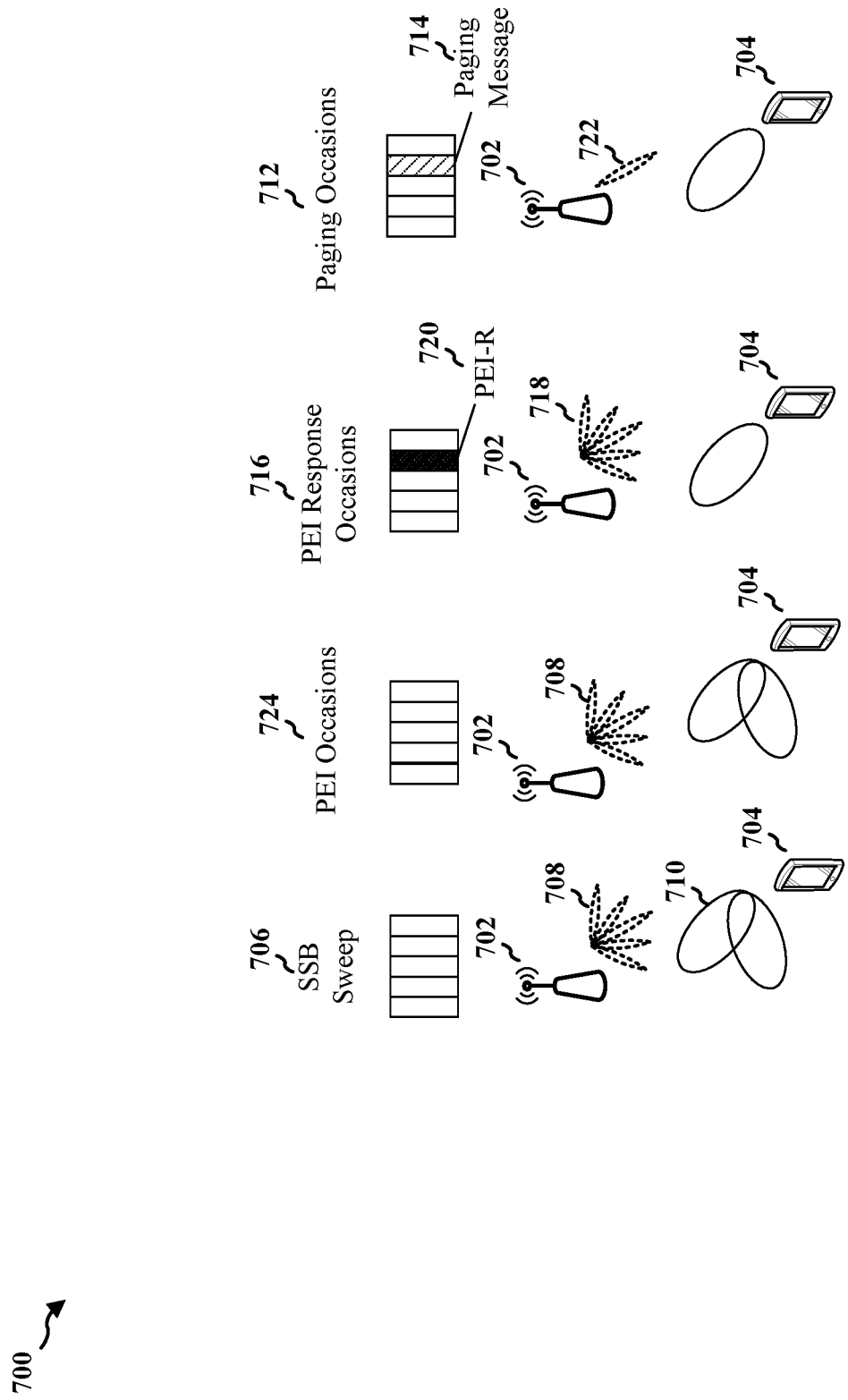
FIG. 7 is a diagram illustrating an example of on-demand paging by a base station of a UE.

FIG. 7 illustrates an example 700 of on-demand paging by a base station 702 of a UE 704 (e.g., an idle or inactive UE). Initially, the base station 702 may perform an SSB beam sweep 706, in which the base station transmits SSBs respectively over different transmission beams 708 to the UE 704. The UE 704, in turn, may monitor for SSBs respectively over different reception beams 710. Generally, if the UE 704 receives an SSB in one of its reception beams 710, the UE may identify a paging configuration from system information associated with that SSB, and the UE 704 may discontinuously monitor a paging occasion 712 indicated in the paging configuration for a paging message 714 from the base station 702. However, since the base station 702 is typically not informed of the location of the UE 704 (e.g., on which cell the UE is camping or the spatial direction of the UE in a given cell), the base station 702 may end up sending paging messages 714 in multiple cells over multiple directions in each cell in attempt to page the UE 704, leading to significant power consumption.

To reduce this energy consumption, the UE 704 may send a reference signal prior to the paging occasion 712. For instance, each of the paging occasions 712 may be respectively associated with an uplink occasion 716 for a given cell and reception beam 718 of the base station 702 (e.g., in a paging configuration associated with an SSB), and the UE 704 may transmit a reference signal 720 in one of the uplink occasions 716 to assist the base station in locating the UE prior to the base station sending the paging message 714. As a result, the base station 702 may not blindly send paging messages 714 in cells excluding the UE 704 or in directions away from the UE 704, thereby reducing transmission beam sweeping by the base station and its associated power consumption. For instance, in the illustrated example 700 where the UE 704 transmits the reference signal 720 in the fourth occasion in a given cell and the base station receives the reference signal 720 via one of its reception beams 718, the base station 702 may transmit the paging message 714 in the corresponding (fourth) paging occasion via corresponding transmission beam 722 in the given cell.

Moreover, each of the uplink occasions 716 may be associated with a prior downlink communication from the base station 702 (e.g., in a paging configuration associated with an SSB). This communication, which may be a downlink reference signal received via PDCCH, is referred to here as a paging early indication (PEI). The PEI may provide power savings to a UE performing discontinuous reception (DRX) when monitoring for paging occasions 712. For instance, the PEI may serving as a wakeup signal which is typically much less complex than the paging message 714 itself. Generally, the base station 702 transmits a PEI respectively in PEI occasions 724 via different transmission beams 708 (e.g., over different directions). If the UE 704 detects a PEI in one of the PEI occasions 724, the UE may wake up from a sleep mode and monitor for a paging message in the upcoming paging occasion. On the other hand, if the UE does not detect a PEI or the PEI is not relevant to that UE (e.g., the PEI does not include a paging radio network temporary identifier (P-RNTI) of the UE), then the UE may determine that there is no paging message in a given paging cycle and the UE may remain in the sleep mode. Thus, the PEI allows the UE 704 to avoid blindly monitoring for paging messages in upcoming paging occasions, thereby reducing UE power consumption.

If the UE 704 detects a PEI in one of the PEI occasions 724, then prior to monitoring an associated paging occasion, the UE 704 may indicate its location to the base station 702 by transmitting the reference signal 720 in the associated uplink occasion 716. As the reference signal 720 is transmitted in response to the PEI, the reference signal here may also be referred to as a PEI response (PEI-R). The UE monitors for PEI-R occasions (uplink occasions 716) and transmits the PEI-R in one of these occasions. The PEI-R may be similar in format to the uplink trigger applied for on-demand SSB and RMSI in the examples of FIGS. 5 and 6A-6C respectively. For instance, the PEI-R may include a same or different format as a RACH preamble. In response to receiving the PEI-R in a given uplink occasion, the base station may detect the presence of the UE 704 and the associated beam direction of the UE for refining its transmission beam 722 for its paging message 714. Thus, both the base station 702 and UE 704 may save energy in the paging process.

Thus, as described in the examples of FIGS. 5, 6A-6C, and 7, the base station may save network energy by performing initial access activities on-demand in response to an uplink reference signal from a UE. However, there is a possibility that the uplink reference signal may not be reliably detected by the base station. For example, referring to FIG. 5, if the UE detects KAS 502 and sends ULT 504 in response to the KAS, the signal quality of this uplink trigger may be poor (e.g., due to path loss between the UE and the base station) and the base station may not be able to successfully decode the ULT. As a result, the network may not activate transmission of the SSB 506 and RMSI 508 or monitor for RACH preamble 510, and thus the UE may not be able to access the network. Similarly, in the examples of FIGS. 6A-6C, if the ULT 612, 640, 672 has such low signal quality that the base station may not successfully decode the ULT, the base station may not transmit RMSI 620, 642, 670 leading to failed network access. Additionally, in the example of FIG. 7, if the reference signal 720 or PEI-R has such low signal quality that the base station 702 may not reliably detect the signal, the base station may not ascertain the location of the UE 704 and thus be unable to save network energy when transmitting paging message 714.

Accordingly, to improve reliability of uplink reference signals (e.g., ULTs or PEI-Rs) for on-demand SSB, RMSI, or paging transmissions, the base station may configure the UE to transmit at least one repetition of such ULTs or PEI-Rs in a given SSB period. For instance, the UE may transmit multiple uplink reference signals (e.g., ULTs 504, 612, 640, 672 or reference signal 720) in uplink occasions (e.g., ULT occasions 638 or uplink occasions 716) associated with different transmission beams (e.g., transmission beams 608, 708) of different downlink reference signals (e.g., KASs 502, SSBs 634, 662, or PEIs), or with a same transmission beam (e.g., transmission beam 608, 708) of a same downlink reference signal (e.g., KAS 502, SSB 634, 662, or PEI), to improve reliability of the uplink reference signal and thus the likelihood that the base station will successfully decode the signal and subsequently activate an on-demand transmission. For instance, in the example 700 of FIG. 7, the UE 704 may detect a PEI in multiple ones of PEI occasions 724 (respectively over different transmission beams 708). As a result, to provide more diversity and thus more reliability in uplink transmissions, the UE 704 may send the PEI-R (reference signal 720) multiple times, namely in the uplink occasions 716 respectively associated with the received PEIs or different transmission beams. Alternatively, the UE 704 may send the PEI-R multiple times in different PEI-R occasions (uplink occasions 716) associated with the same PEI occasion 724 or transmission beam 708, to similarly improve reliability of the uplink reference signal.

With respect to RACH transmissions, RACH preambles (e.g., RACH preamble 510) are distinct from the uplink reference signals (e.g., ULTs 504, 612, 640, 672 or reference signal 720). For instance, while RACH preamble repetitions over a same or different transmission beam may increase the reliability of the RACH process for coverage enhancement of UEs at low signal to noise ratios (SNRs), access procedures prior to RACH (e.g., initial access via SSB and RMSI transmissions, or paging) may benefit not only from improved reliability but also primarily from network energy savings for these transmissions. For example, if a UE transmits multiple uplink reference signals via different transmission beams for on-demand transmission activation, this approach to improve reliability of the uplink reference signals may end up creating additional network energy consumption or overhead since the base station may similarly be triggered multiple times to transmit an SSB, RMSI or a paging message in different directions, or to monitor for a RACH preamble from different directions. For instance, in an alternative to the example 700 of FIG. 7, if the UE 704 transmits reference signal 720 in multiple uplink occasions 716 respectively associated with different transmission beams 718 of the base station 702, the base station may be triggered to transmit paging message 714 in multiple, corresponding transmission beams 722 to the UE 704 as a result, leading to more power consumption by the network.

A similar result may occur in the other examples of FIGS. 5 and 6A-6C for SSB s and RMSI.

Therefore, while allowing the UE to send repetitions of an uplink reference signal in occasions associated with one or multiple beam directions may result in improved signal reliability for on-demand SSB, RMSI, or paging activation, unconditionally allowing such repetitions to occur may not necessarily be power-efficient or link-efficient. Therefore, it would be helpful to impose conditions on these repetitions to prevent an unnecessary amount of network energy consumption or overhead at the base station. For example, referring to the example 700 of FIG. 7, if the UE 704 detects during associated PEI occasions 724 that one of these transmission beams 708 is associated with a reference signal receive power (RSRP) that exceeds farthest beyond a given threshold compared to the RSRPs associated with the other transmission beams (and thus that this beam is the most reliable or strongest beam), the UE 704 may determine to transmit the PEI-R (reference signal 720) in the uplink occasion 716 only corresponding to that strongest transmission beam. The UE 704 may refrain in this case from performing repetitions in other uplink occasions associated with the weaker transmission beams since there may be less benefit to the UE in such activity and since triggering the base station 702 to send multiple downlink communications in different paging occasions associated with the weaker transmission beams may therefore not be necessary. Therefore, it would be helpful for the base station to provide a balance between network energy savings and improving uplink trigger reliability when configuring the UE to perform ULT or PEI-R repetitions.

Figure 8:
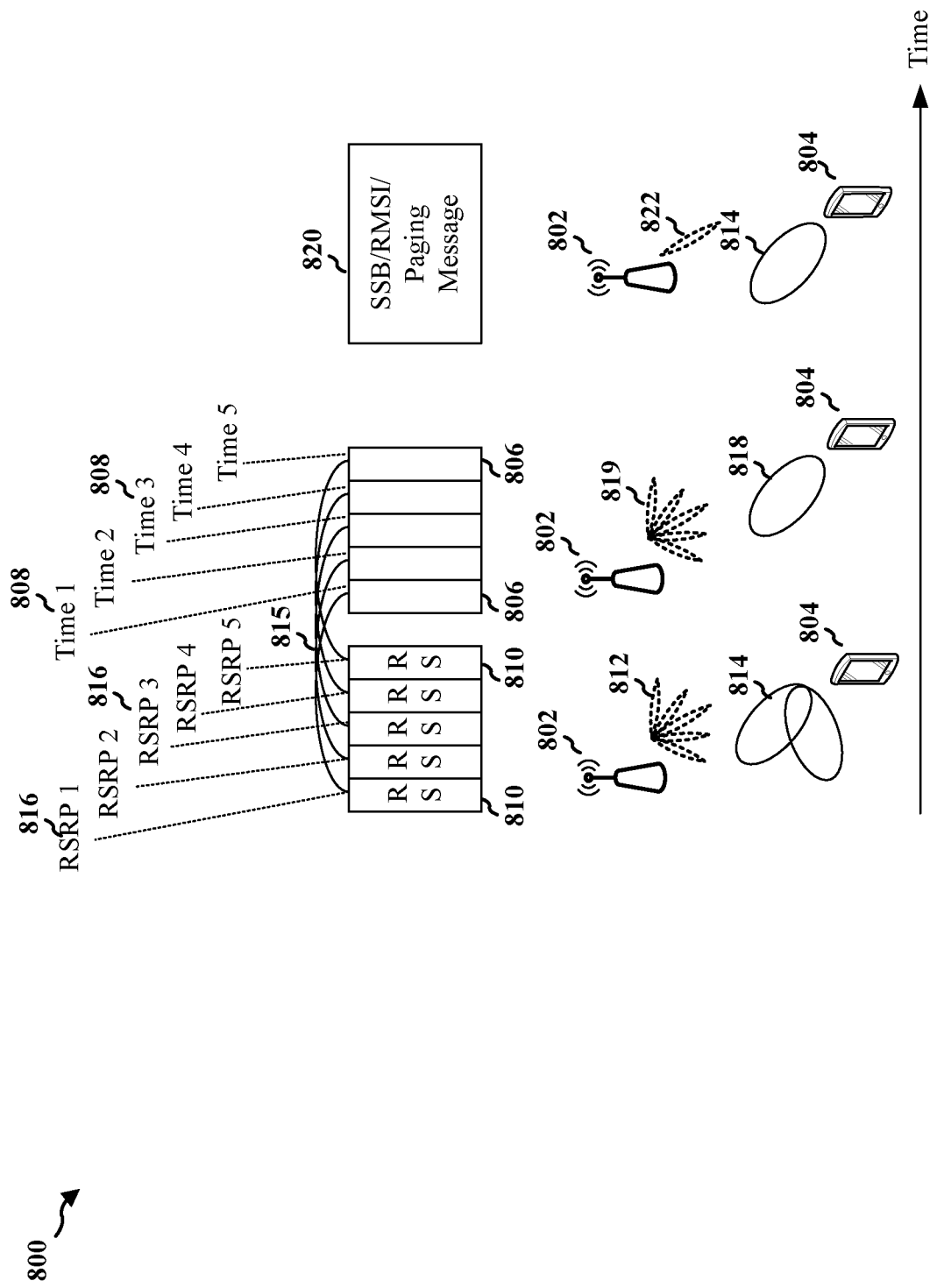
FIG. 8 is a diagram illustrating an example of a first approach for achieving a balance between network energy savings and uplink reference signal reliability or diversity for on-demand SSB, RMSI, or paging message activation.

FIG. 8 illustrates an example 800 of a first approach for achieving a balance between network energy savings and uplink reference signal reliability or diversity for on-demand SSB, RMSI, or paging message activation. In this example, a base station 802 may configure rules for a UE 804 to consider when transmitting repetitions of an uplink reference signal such as ULTs and PEI-Rs in uplink occasions 806 occurring at different times 808. Each uplink occasion may be associated with a downlink reference signal 810 received via a transmission beam 812 of the base station 802 and a reception beam 814 of the UE 804. That is, a one-to-one mapping 815 exists between downlink reference signals 810 and uplink occasions 806 (e.g., uplink occasions are associated with different beams). If the UE 804 receives multiple downlink reference signals such as KASs, SSBs, DCIs in PDCCH, or PEIs via different transmission beams 812 of the base station, the UE may measure an RSRP 816 of each received reference signal and compare the RSRPs against one or more configured thresholds (e.g., a RSRP high threshold, a RSRP low threshold, or an effective RSRP threshold). Based on the measurements and configured rules applying these thresholds, the UE 804 may transmit repetition(s) of the uplink reference signal via a transmission beam 818 (or multiple transmission beams) to the base station 802 in one or more of the uplink occasions 806. In response to receiving the repetition(s) in the uplink occasion(s) via a reception beam 819, the base station 802 may successfully decode the signal and consequently transmit information 820 such as an SSB, RMSI, or paging message (or monitor for a RACH preamble) via a transmission beam 822 in a resource activated by or associated with the uplink reference signal (e.g., one or more resource blocks in PBCH, PDCCH, PDSCH, or a paging occasion such as described with respect to FIGS. 5, 6A-6C, or 7, respectively).

In one example rule, if the strongest downlink reference signal or transmission beam which is detected and measured by the UE includes an RSRP beyond an RSRP high threshold (e.g., if the UE detects multiple downlink reference signals associated with multiple transmission beams and one of the beams has a significantly high RSRP), the UE may send the repetition in the uplink occasion associated with that strongest beam. In such case, the UE may not send repetitions in uplink occasions associated with the other weaker transmission beams, thereby preventing inefficient energy consumption at the UE and network sides. However, if the UE detects that multiple downlink reference signals or transmission beams include RSRPs exceeding the RSRP high threshold, the UE may flexibly send the repetition in the uplink occasion associated with any one of these strongest beams. For instance, referring to FIG. 8, if the UE 804 measures the RSRPs 816 of the five downlink reference signals and determines that only RSRP 1 exceeds the RSRP high threshold, the UE may only transmit an uplink reference signal in the associated uplink occasion 806 at Time 1. However, if the UE 804 determines that RSRP 1 and RSRP 2 both exceed the RSRP high threshold, the UE may select to transmit the uplink reference signal in the associated uplink occasion 806 either at Time 1 or Time 2.

In another example, if the UE detects multiple downlink reference signals or transmission beams include an RSRP stronger than a RSRP low threshold but weaker than the RSRP high threshold (e.g., even the strongest beam, while not significantly strong, is still relatively strong over other beams), the UE may send multiple uplink reference signals in occasions respectively associated with even the weaker beams in order to achieve increased reliability and diversity. However, under this rule, there may be a cap or limit on the number (quantity) of occasions K in which the UE may send the uplink reference signal (e.g., the strongest K=2 beams). For instance, referring to FIG. 8, if the UE 804 determines that RSRP 1, RSRP 2, and RSRP 3 of associated downlink reference signals 810 all exceed the RSRP low threshold but do not meet the RSRP high threshold, the UE 804 may transmit the uplink reference signal in the associated uplink occasions 806 for each of these downlink reference signals at Time 1, Time 2, and Time 3 respectively. However, if the base station 802 configures a limit K=2 on the number of occasions allowed for uplink reference signal repetition, then the UE may transmit the uplink reference signal in only two of the associated uplink occasions at Time 1, Time 2, and Time 3 in this example.

In a further example, the base station may configure a threshold for the UE to compare against a combined (an "effective") RSRP of multiple downlink reference signals when considering uplink occasions for uplink reference signal repetition. In contrast to the RSRP low threshold and RSRP high threshold previously described, this effective RSRP threshold may be a separate threshold (e.g., higher than the RSRP low threshold) which is not applied for individual beam or measurement comparisons but for multiple beam or measurements comparisons. The UE may obtain an effective RSRP of multiple downlink reference signals by combining their individual RSRPs (e.g., by summing the individual RSRPs in the linear domain). For instance, in the example of FIG. 8, if the UE 804 detects multiple downlink reference signals 810 via transmission beams 812 and measures RSRPs 816 for each detected signal, the UE may obtain an effective RSRP of the downlink reference signals by for example, performing a summation of the RSRPs 816 in the linear domain. After obtaining the effective RSRP, the UE 804 may compare this combined or effective RSRP against the configured, effective RSRP threshold to determine whether to transmit an uplink reference signal repetition in associated uplink occasions 806. For instance, if the combined RSRP of two of the downlink reference signals 810 (e.g., the summation of RSRP 1 and RSRP 2) exceed the effective RSRP threshold, the UE may transmit the uplink reference signal in the associated uplink occasions 806 (e.g., the occasions occurring at Time 1 and Time 2).

In another example, the UE may be configured to transmit uplink reference signal repetitions in up to k uplink occasions associated with the strongest downlink reference signals having an effective RSRP meeting the effective RSRP threshold. As an example, referring to FIG. 8, assume for purposes of illustration that the base station 802 configures the UE 804 to select at most three uplink occasions associated with the strongest downlink reference signals or beams (K=3) whose effective RSRP exceeds an effective RSRP threshold X (k=3). Moreover, assume in this illustrative example that the UE 804 detects at least three of the downlink reference signals 810 having RSRPs 1, 2, and 3, where RSRP 1, 2, and 3 respectively have the values X1, X2, and X3 each individually exceeding the RSRP low threshold but not individually meeting the RSRP high threshold or the effective RSRP threshold. In such example, the UE 804 may check whether one of these reference signals exceeds the effective RSRP threshold. Here, neither X1, X2, or X3 meet the effective RSRP threshold, so the UE may not transmit an uplink reference signal repetition in the uplink occasions associated with Time 1, Time 2, or Time 3 individually. As a result, the UE 804 may next check whether two of these reference signals when their RSRPs are combined meet the effective RSRP threshold. For instance, the UE may combine the values of the two RSRPs 1 and 2 to arrive at an effective RSRP X1+X2, the two RSRPs 1 and 3 to arrive at an effective RSRP X1+X3, or the two RSRPs 2 and 3 to arrive at an effective RSRP X2+X3, and the UE may compare one or more of these combined RSRPs with the effective RSRP threshold. If any of these effective RSRPs meet the effective RSRP threshold, the UE 804 may transmit the uplink reference signal in the two associated uplink occasions accordingly (e.g., at Time 1 and 2, Time 1 and 3, or Time 2 and 3). Otherwise, if the threshold is not met, the UE may proceed to check whether all three reference signals when their RSRPs are combined (X1+X2+X3) meet the effective RSRP threshold. If the effective RSRP meets the threshold in this case, then the UE 804 may transmit uplink reference signal repetitions in the three uplink occasions associated with Times 1, 2, and 3 accordingly.

The effective RSRP threshold may be a threshold having a value between the RSRP low threshold and the RSRP high threshold. Thus, any downlink reference signal or transmission beam including an RSRP which is between the RSRP low threshold and RSRP high threshold may be a candidate for comparison against the effective RSRP threshold. As previously described, if the UE determines that a single downlink reference signal or beam does not meet the effective RSRP threshold (even though it is higher than the RSRP low threshold), then the UE may check the combined RSRP of two downlink reference signals or beams, and continue checking larger quantities of signals or beams until their effective RSRP meets the effective RSRP threshold (or a limit on the quantity k of uplink occasions is met). As a result, if a large quantity of reference signals or transmission beams happens to be applied when combining RSRPs to meet the effective RSRP threshold, the effective (e.g., summed) RSRP may potentially even exceed the RSRP high threshold.

Figure 9:
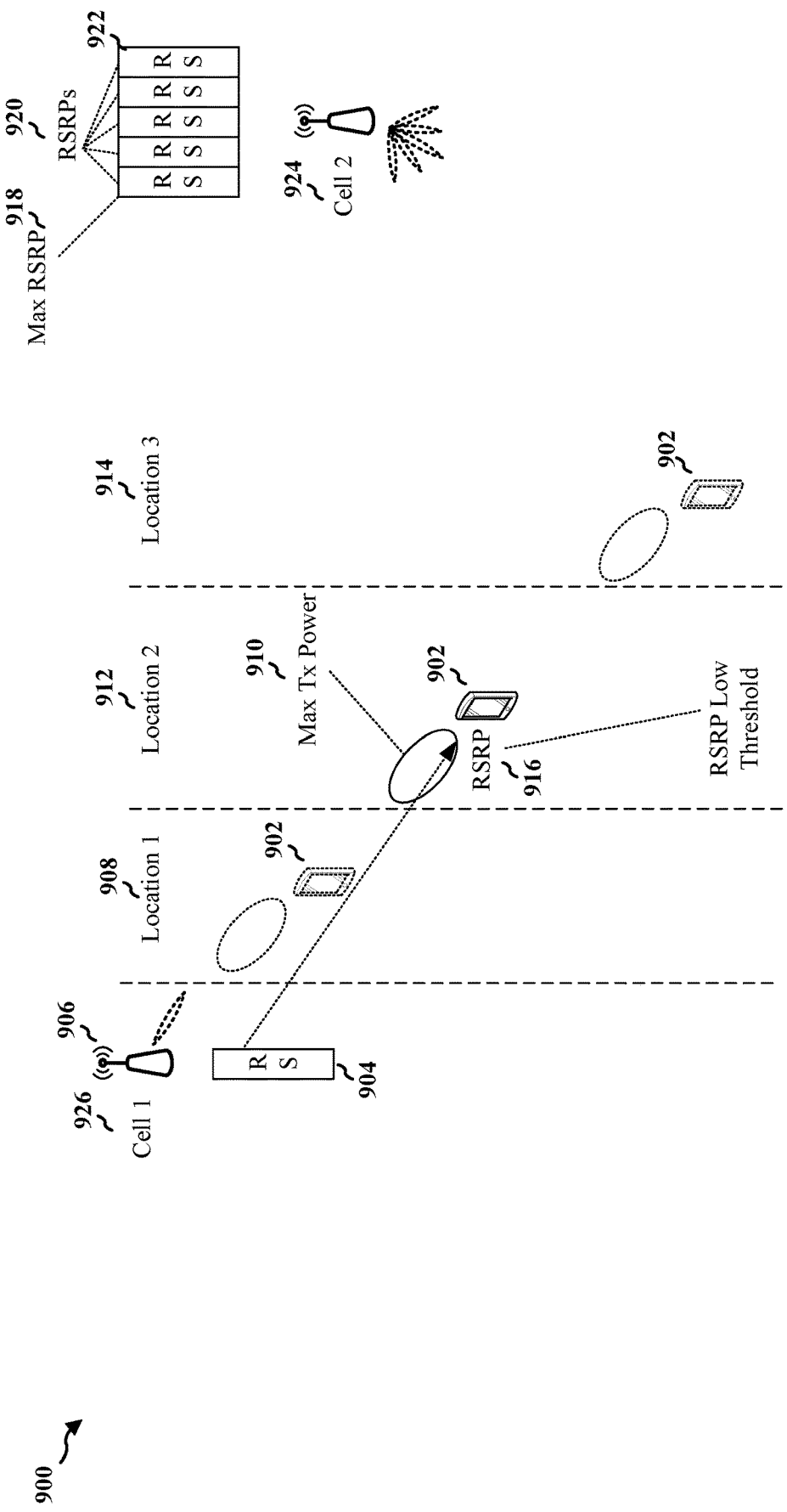
FIG. 9 is a diagram illustrating an example of a UE which receives a downlink reference signal from a base station.

FIG. 9 illustrates an example 900 of a UE 902 which receives a downlink reference signal 904 (e.g., downlink reference signal 810) from a base station 906. This example illustrates that the RSRP low threshold may be associated with an estimated path loss between the base station 906 and the UE 902, depending on the power control policy that the UE 902 may apply to its uplink reference signals (e.g., ULTs or PEI-Rs in uplink occasions 806). For example, when the UE 902 transmits an uplink signal to the base station 906 such as a RACH preamble, the received power at the base station (e.g., the preamble target received power in the case of a RACH preamble) may be reduced due to the path loss between the UE 902 and the base station 906. Generally, if the received power of the signal at the base station is below a minimum target received power of the base station, the base station may not be able to successfully decode the signal. Therefore, in order to prevent this situation from occurring, the UE 902 generally increases its transmission power as it moves farther away from the base station, for example, away from a location 908. This increase in transmission power may compensate for the increased path loss which may occur between the UE 902 and the base station 906 as the UE moves farther away from the base station. However, at some point, the UE 902 may end up reaching its maximum transmission power 910, for example, at a location 912. At this point, the UE 902 may not increase its transmission power further, and therefore if the UE 902 moves even farther away from the base station 906, for example, to location 914, the UE 902 may not be able to continue compensating for the increased path loss. As a result, at location 914, the received power of the signal may drop below the minimum target received power of the base station 906, preventing successful decoding at the base station. Thus, the UE may determine the RSRP low threshold to be an RSRP 916 of the downlink reference signal 904 observed by the UE 902 at the location 912 where the UE transmits the uplink signal at maximum transmission power 910 in order to meet the minimum target received power at the base station 906.

In the above examples, the UE may transmit uplink reference signals in the uplink occasion(s) associated with the strongest downlink reference signal(s) whose RSRP exceeds the RSRP low threshold. However, if even the strongest downlink reference signal or transmission beam which the UE detects is less than the RSRP low threshold, then the UE may decide not to select or camp on the cell in which the downlink reference signals were received. For example, referring to FIGS. 8 and 9, if the UE 804, 902 determines that even a maximum RSRP 918 of RSRPs 816, 920 observed from downlink reference signals 922 in a cell 924 is weaker than the RSRP low threshold, the UE may not transmit any uplink reference signals in the uplink occasions 806 within that cell since the UE may determine that this cell would be too weak to serve the UE adequately. Instead, the UE may check a different cell in the network and determine whether to transmit uplink reference signals in associated uplink occasions in response to RSRP comparisons of other downlink reference signals in that different cell. However, if the UE has exhausted its search for cells in the network and could not find a stronger cell, then the UE may attempt to transmit the uplink reference signal in the associated uplink occasion for the strongest downlink reference signal or transmission beam notwithstanding its RSRP failing to meet the RSRP low threshold. For instance, referring to FIGS. 8 and 9, even if the UE 804, 902 determines that the maximum RSRP 918 of RSRPs 816, 920 is weaker than the RSRP low threshold, if the UE 804, 902 could not locate any other cell whose downlink reference signals included RSRPs exceeding this maximum RSRP, the UE 804 may transmit the uplink reference signal in the uplink occasion 806 associated with this maximum RSRP regardless of the RSRP low threshold. For example, referring to FIG. 9, the UE 902 may determine to camp in the cell 924 if the UE does not observe a stronger RSRP in cell 926 (e.g., the UE is at location 914) or any other cell.

Figure 10:
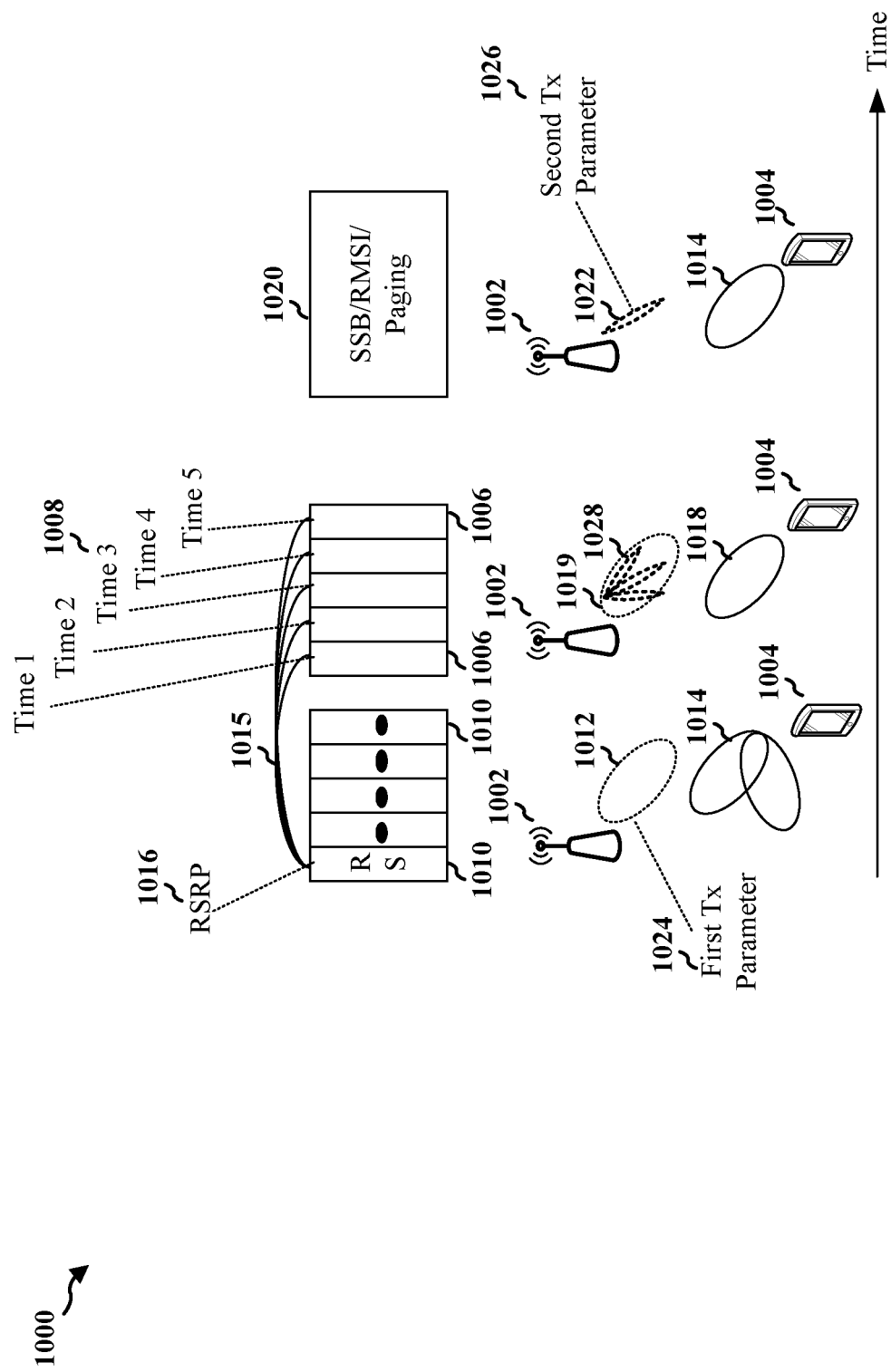
FIG. 10 is a diagram illustrating an example of a second approach for achieving a balance between network energy savings and uplink reference signal reliability or diversity for on-demand SSB, RMSI, or paging message activation.

FIG. 10 illustrates an example 1000 of a second approach for achieving a balance between network energy savings and uplink reference signal reliability or diversity for on-demand SSB, RMSI, or paging message activation. In this example, a base station 1002 may configure similar rules as described above with respect to FIGS. 8 and 9 for a UE 1004 to consider when transmitting repetitions of an uplink reference signal such as ULTs and PEI-Rs in uplink occasions 1006 occurring at different times 1008. However, unlike the previous example where a one-to-one mapping exists between downlink reference signals and uplink occasions (e.g., uplink occasions are associated with different beams providing beam diversity), in this example, a one-to-many mapping 1015 may exist between a downlink reference signal 1010 and the uplink occasions 1006 (e.g., uplink occasions are associated with a same beam without beam diversity). For instance, in the illustrated example, one downlink reference signal may be received via a transmission beam 1012 of the base station 1002 and a reception beam 1014 of the UE 1004. Based on a measurement of an RSRP 1016 of the downlink reference signal 1010 and similar rules for applying configured RSRP thresholds, the UE 1004 may transmit repetition(s) of the uplink reference signal via a transmission beam 1018 to the base station 1002 in one or more of the uplink occasions 1006. In response to receiving the repetition(s) in the uplink occasion(s) via a reception beam 1019, the base station 1002 may successfully decode the signal and consequently transmit information 1020 such as an SSB, RMSI, or paging message (or monitor for a RACH preamble) via a transmission beam 1022 in a resource activated by or associated with the uplink reference signal (e.g., one or more resource blocks in PBCH, PDCCH, PDSCH, or a paging occasion such as described with respect to FIGS. 5, 6A-6C, or 7, respectively).

Figure 11:
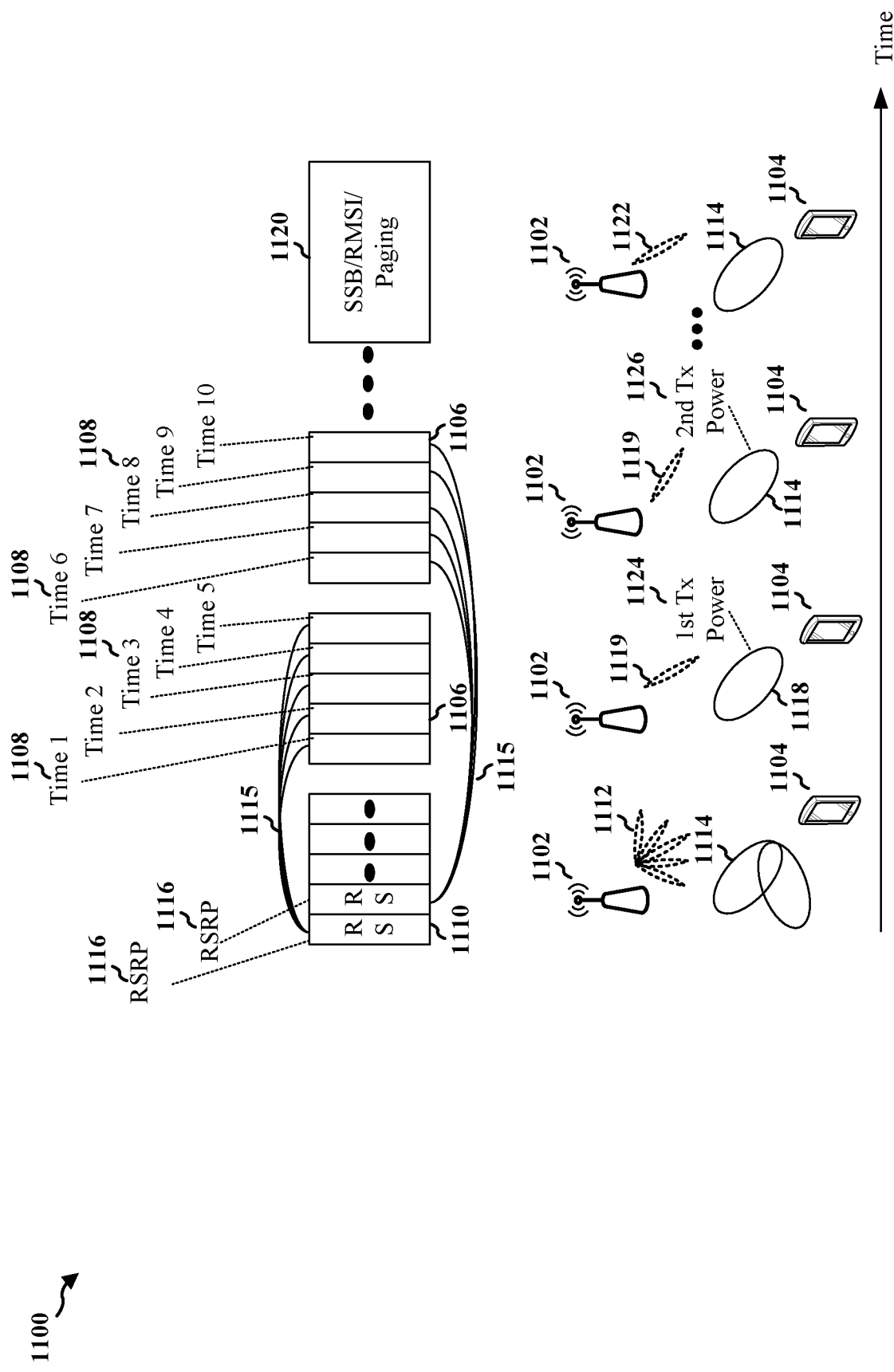
FIG. 11 is a diagram illustrating an example of a third approach for achieving a balance between network energy savings and uplink reference signal reliability or diversity for on-demand SSB, RMSI, or paging message activation, which combines the first approach of FIG. 9 and the second approach of FIG. 10.

FIG. 11 illustrates an example 1100 of a third approach for achieving a balance between network energy savings and uplink reference signal reliability or diversity for on-demand SSB, RMSI, or paging message activation, which combines the first approach of FIG. 9 and the second approach of FIG. 10. In this example, similar to the example of FIG. 10, a base station 1102 may configure similar rules as described above with respect to FIGS. 8 and 9 for a UE 1104 to consider when transmitting repetitions of an uplink reference signal such as ULTs and PEI-Rs in uplink occasions 1106 occurring at different times 1108. However, unlike the previous examples of FIGS. 9 and 10 where either a one-to-one mapping or a one-to-many mapping exists between downlink reference signals and uplink occasions (e.g., uplink occasions are associated with either different beams or a same beam), in this example, multiple mappings 1115 exist between downlink reference signals and uplink occasions (e.g., one set of uplink occasions is associated with one beam, another set of uplink occasions is associated with a different beam, etc.). For instance, in the illustrated example, multiple downlink reference signals 1110 may be received via different transmission beams 1112 of the base station 1102 and a reception beam 1114 of the UE 1104. Based on measurements of RSRPs 1116 of the downlink reference signals 1110 and similar rules for applying configured RSRP thresholds, the UE 1104 may transmit repetition(s) of the uplink reference signal via a transmission beam 1118 to the base station 1102 in one or more of the uplink occasions 1106 respectively associated with one or more of the downlink reference signals 1110. In response to receiving the repetition(s) in the uplink occasion(s) via one or more reception beams 1119, the base station 1102 may successfully decode the signal and consequently transmit information 1120 such as an SSB, RMSI, or paging message (or monitor for a RACH preamble) via a transmission beam 1122 in a resource activated by or associated with the uplink reference signal (e.g., one or more resource blocks in PBCH, PDCCH, PDSCH, or a paging occasion such as described with respect to FIGS. 5, 6A-6C, or 7, respectively).

In one example, the base station may configure a quantity M of uplink occasions for each downlink reference signal or transmission beam. For instance, in the illustrated example of FIG. 10, the base station 1002 may configure the mapping 1015 such that downlink reference signal 1010 is associated with five uplink occasions (M=5). In turn, the UE may be configured to transmit its uplink reference signal in a quantity m of these M occasions (i.e., in m of M occasions, where m≤M). For instance, in the example of FIG. 10, the base station 1002 may configure the UE 1004 to transmit its uplink reference signal repetition in either one, two, three, four, or five of the uplink occasions 1006 (e.g., m=1, 2, 3, 4, or 5). The UE may select the quantity of m based on RSRP threshold comparisons or rules similar to those previously described with respect to FIG. 8. For instance, in the example of FIG. 10, the UE 1004 may transmit in one uplink occasion (m=1) if the RSRP 1016 exceeds the RSRP high threshold, the UE 1004 may transmit in two uplink occasions (m=2) if the RSRP 1016 does not meet the RSRP high threshold but exceeds a first threshold above the RSRP low threshold, the UE 1004 may transmit in three uplink occasions (m=3) if the RSRP 1016 does not meet the first threshold but exceeds a second threshold above the RSRP low threshold, and so forth (e.g., up to a limit on the value of m).

In another example where the base station configures multiple mappings between downlink reference signals and uplink occasions in the time domain, the UE may further be configured to transmit its uplink reference signal in uplink occasions associated with a quantity n of N downlink reference signals or transmission beams, as well as in the quantity m of M occasions associated with each downlink reference signal or transmission beam. For instance, in the illustrated example of FIG. 11, if the UE 1104 receives five reference signals from base station 1102 via different transmission beams 1112, then for one, two, three, four, or five of these downlink reference signals 1110 (n=1, 2, 3, 4, or 5), the UE may transmit an uplink reference signal repetition in up to one, two, three, four, or five uplink occasions associated with an nth RS or beam (m=1, 2, 3, 4, or 5).

The UE may select the values of n and m based on RSRPs of reference signals, time locations of reference signals or associated occasions, or rules similar to those previously described with respect to FIGS. 8-10. For instance, in the example of FIG. 11, the UE 1104 may transmit in uplink occasion(s) 1106 associated with one downlink reference signal (n=1) if the RSRP 1116 of that reference signal exceeds the RSRP high threshold, the UE may transmit in uplink occasion(s) 1106 associated with two downlink reference signals (n=2) if the RSRPs 1116 of those reference signals each individually do not meet the RSRP high threshold but exceed the RSRP low threshold or if the effective RSRP of those reference signals exceed the effective RSRP threshold, and so forth (e.g., up to a limit on the value of n). Then, for each nth reference signal or beam, the UE 1104 may transmit in one uplink occasion (m=1) if the RSRP 1116 of the nth RS exceeds the RSRP high threshold, the UE 1104 may transmit in two uplink occasions (m=2) if the RSRP 1116 of the nth RS does not meet the RSRP high threshold but exceeds a first threshold above the RSRP low threshold, the UE 1104 may transmit in three uplink occasions (m=3) if the RSRP 1116 of the nth RS does not meet the first threshold but exceeds a second threshold above the RSRP low threshold, and so forth (e.g., up to a limit on the value of m). Thus, the UE may transmit uplink reference signal repetitions in the strongest m uplink occasions associated with the strongest n reference signals or transmission beams.

As previously described, the uplink reference signal repetitions are distinct from RACH preamble repetitions. For example, while RACH preamble repetitions are primarily intended to improve reliability of these transmissions for coverage enhancement of UEs observing low SNRs (regardless of network energy consumption), the uplink reference signal repetitions of FIGS. 8-11 may balance network energy consumption with improved reliability of these transmissions for on-demand SSB, RMSI, paging, or RACH monitoring. Additionally, while contention handling is a factor to consider in RACH preamble repetition, there is no such factor for uplink reference signal repetitions. For instance, in a RACH procedure, multiple UEs may attempt to access the network without synchronization and thus collide with each other, leading to contention resolution. Thus, a large pool of RACH occasions or RACH message preamble formats may be configured to minimize the chances of collision and contention. In contrast, no such notion of collision exists between UEs attempting to send ULT or PEI-R repetitions to wake up the base station for on-demand SSB, RMSI, RACH monitoring, or paging, since one UE may equally benefit from another UE waking up the base station.

Thus, since the base station does not need to differentiate UEs at different coverage distances to address contention resolution in the uplink reference signal repetitions of FIGS. 8-11, it is not necessary for these repetitions to include a similarly large pool of uplink occasions or reference signal formats as those related to RACH preambles. However, the base station may still seek to ensure that an uplink reference signal from a UE with the farthest coverage distance from the base station (e.g., the weakest uplink reference signal) may still be detected in order to benefit other UEs via activation of SSBs, RMSI, paging, or RACH monitoring. To achieve this detection, the base station may set the RSRP low threshold to the RSRP which the UE, at the farthest location from the base station among other UEs, observes from downlink reference signals of the base station when the UE is at a location where the UE transmits an uplink signal at a maximum transmission power to meet the minimum target received power of the base station. For instance, in the example of FIG. 9, if multiple ones of UEs 902 are in location 912, the base station 906 may set the RSRP low threshold to the RSRP 916 of whichever UE is farthest from the base station in location 912.

In another example, after the UE determines the quantity m of uplink reference signal repetitions or occasions to apply in response to a given downlink reference signal (e.g., based on RSRP such as described with respect to FIGS. 10 and 11), the UE may be configured to send these repetitions in a structured order starting from the first occasion. For instance, in the examples of FIGS. 10 and 11, after the UE selects m=1, 2, 3, 4, or 5 repetitions for uplink occasion 1006, 1106 based on RSRP comparison rules, the UE may be configured to send the uplink reference signal repetition in the first m associated occasions (i.e., uplink occasions 1 . . . m in order of time), as opposed to arbitrary uplink occasions. For example, in the examples of FIGS. 10 and 11, if the base station 1002, 1102 configures mapping 1015, 1115 such that one of the downlink reference signals 1010, 1110 is associated with four uplink occasions (M=4) and if the UE 1004, 1104 is configured to transmit an uplink reference signal in two of these four occasions (m=2), the UE may not arbitrarily select any two of these uplink occasions 1006, 1106 for the uplink signal but may chronologically select the first two occasions at Time 1 and Time 2.

The base station may configure UEs to send their uplink reference signal repetitions chronologically in associated uplink occasions (rather than arbitrarily) in order to determine the largest value of m (the largest number of repetitions) of those applied by the UEs in response to a given downlink reference signal. This largest value of m may implicitly inform the base station of the quality of the channel between the base station and the UE at the farthest or weakest coverage distance. For instance, in the examples of FIGS. 10 and 11, if the base station 1002, 1102 monitors four uplink occasions associated with a given downlink reference signal (M=4) and receives an uplink reference signal from multiple ones of UEs 1004, 1104 in the first three of these uplink occasions 1006, 1106 (m=3), the base station 1002, 1102 may determine that at least one of the UEs 1004, 1104 ended up transmitting three repetitions in order to satisfy the configured RSRP rules (e.g., due to being at the farthest coverage distance from the base station compared to other UEs). The base station may then take this information into account when sending information 1020 by modifying one or more transmission parameters (e.g., a modulation and coding scheme (MCS), PDCCH resources for RMSI, a transmission power, a RACH configuration, a number of repetitions of subsequent downlink signals to apply, etc.) accordingly. For instance, referring to FIG. 10, if the base station 1002 originally transmitted the downlink reference signal 1010 using a first transmission parameter 1024 (e.g., one MCS or Tx power), the base station may transmit the information 1020 using a second transmission parameter 1026 (e.g., a different MCS or Tx power) to account for the signal quality of the UE which ended up sending the most repetitions. For example, the base station may decrease the MCS or increase Tx power of information 1020 to accommodate the weakest UE. Later, if the base station receives an uplink reference signal from multiple UEs in less uplink occasions (e.g., the first two occasions or m=2), the base station may determine that the weakest UE has become stronger and therefore may increase the MCS or decrease the Tx power accordingly.

In one example, the base station may configure a different waveform for an uplink reference signal (e.g., a different sequence identifier, cyclic shift, etc.) for different quantities of uplink occasions or reference signals. For instance, referring to FIGs. and 11, if the UE 1004, 1104 is configured to transmit an uplink reference signal repetition in m=1, 2, 3, 4, or 5 uplink occasions, the base station 1002, 1102 may configure the UE 1004, 1104 to apply a different sequence, cyclic shift, or other parameter to its uplink reference signal repetitions for different values of m. For example, the UE may transmit uplink reference signal repetitions using one sequence ID or cyclic shift for its repetition if m=1, a second sequence ID or cyclic shift for each of its repetitions if m=2, a third sequence ID or cyclic shift for each of its repetitions if m=3, and so forth. Thus, the UE may respectively apply different reference signal sequences for different quantities of uplink occasions or reference signals. As a result, if multiple UEs transmit uplink reference signals with different values of m (and thus different reference signal sequences), the base station may be able to differentiate between stronger and weaker UEs in terms of RSRP from the different sequences. The reference signal sequences the UEs may apply may also be selected from different pools of sequences associated with different values of m.

In another example, the base station may configure the UE to apply different transmission powers to uplink reference signal repetitions in respective uplink occasions associated with a same downlink reference signal or transmission beam. For instance, in the example of FIG. 10, if the base station 1002 configures mapping 1015 such that one of the downlink reference signals 1010 is associated with five uplink occasions (M=5), and if the UE 1004 is configured to transmit a repetition in one, two, three, four, or five of these uplink occasions (m=1, 2, 3, 4, or 5), then the UE may further be configured to apply a different transmission power to its uplink reference signal in each of the uplink occasions 1006. For instance, the UE 1004 may ramp its transmission power for each mth repetition such that a higher Tx power is applied in each successive uplink occasion (e.g., Time 1 corresponds to an initial Tx power, Time 2 corresponds to a higher Tx power, Time 3 corresponds to an even higher Tx power, and so forth). However, if the base station maps multiple downlink reference signals or transmission beams respectively to multiple uplink occasions, then the base station may configure the UE to apply power ramping across the associated uplink occasions for one transmission beam but not to continue this power ramping in associated uplink occasions for a different transmission beam. For instance, referring to the example of FIG. 11 where the base station 1102 configures multiple mappings 1115 of downlink reference signals 1110 to uplink occasions 1106, the UE 1104 may ramp its Tx power in the uplink occasions 1106 associated with one downlink reference signal from Time 1 to Time 5 (similar to the example of FIG. 10), but the UE 1104 may not continue ramping its Tx power even higher in the uplink occasions 1106 associated with another downlink reference signal from Time 6 to Time 10. Instead, after the UE 1104 ramps or increases its Tx power to a first transmission power 1124 at Time 5, the UE 1104 decreases or resets its Tx power back to an initial state or second transmission power 1126 beginning at Time 6. The UE 1104 may afterward again ramp its Tx power from Time 6 to Time 10, and continue ramping and resetting its Tx power similarly for other uplink occasions associated with different downlink reference signals.

In another example, the base station may configure the UE to apply different formats to its uplink reference signal repetitions in uplink occasions associated with a same downlink reference signal or transmission beam. For instance, referring to the example of FIG. 11, the base station 1102 may configure the UE 1104 to transmit an uplink reference signal in the uplink occasion 1106 at Time 1 using one format, in the uplink occasion 1106 at Time 2 using a different format, and so forth. The uplink reference signal format here may indicate, for example, a quantity of symbols for the reference signal, a time domain location for the reference signal, a sequence identifier for the reference signal, or other information. Moreover, the uplink reference signal format may be the same as or similar to a RACH preamble format, or the uplink reference signal format may be a different format. For instance, again referring to the example of FIG. 11, if the UE 1104 is configured to transmit a repetition in m=1, 2, 3, 4, or 5 uplink occasions associated with a single downlink reference signal, the uplink reference signal at each successive uplink occasion may have a longer format than in the previous uplink occasion. Thus, an uplink reference signal at Time 1 may have an initial format, the uplink reference signal at Time 2 may have a longer format, the uplink reference signal at Time 3 may have an even longer format, and so forth. This approach allows the base station to better detect the repetitions of UEs in farther coverage distances (weaker UEs), since these UEs would be configured in this manner to apply longer signal formats. These longer formats in turn allow the signal to be carried over the air for a longer time, thereby allowing the base station to accumulate energy from the signal for a longer time and to more easily decode weaker signals with greater quantities of repetitions.

In a further example, the base station may configure the UE to apply a different waveform (e.g., a sequence ID) to each of its uplink reference signal repetitions associated with a same downlink reference signal or transmission beam. The sequence IDs may be taken from a set of sequence IDs out of multiple, preconfigured or configured sets of sequence IDs. For instance, referring to FIG. 11, if the UE 1104 is configured to transmit m=1, 2, 3, 4, or 5 repetitions in uplink occasions 1106 associated with a same downlink reference signal 1110, the base station 1102 may configure the UE 1104 to apply a different sequence for each mth repetition or uplink occasion in a set of configured or preconfigured sequences based on the order of sequences in the set. As an example, if the UE 1104 is configured to apply a given set {Sequence A, Sequence B, Sequence C} for m=3 repetitions in the uplink occasions 1106 associated with one of the downlink reference signals 1110, then the UE 1104 may transmit the first repetition at Time 1 using Sequence A, the second repetition at Time 2 using Sequence B, and the third repetition at Time 3 using Sequence C. This approach provides diversity in the code-domain and interference randomization. Moreover, different sets of sequence IDs may be pre-configured or configured for different quantities of repetitions (different values of m). For instance, in the example of FIG. 11, if the UE 1104 transmits three repetitions (m=3), the UE may apply the set {Sequence A, Sequence B, Sequence C} such as previously described, while if the UE 1104 transmits two repetitions (m=2), the UE may apply a different set {Sequence D, Sequence E} for its repetitions in a similar manner. Additionally, different sets of sequence IDs may be configured for a same quantity of repetitions (a same value of m) in uplink occasions associated with a different downlink reference signal or transmission beam. For instance, in the example of FIG. 11, if the UE 1104 transmits three repetitions (m=3), the UE may apply the set {Sequence A, Sequence B, Sequence C} at Times 1, 2, and 3 and a different set {Sequence D, Sequence E, Sequence F} at Times 6, 7, 8. Alternatively, the sets of sequence IDs may be the same.

Figure 12:
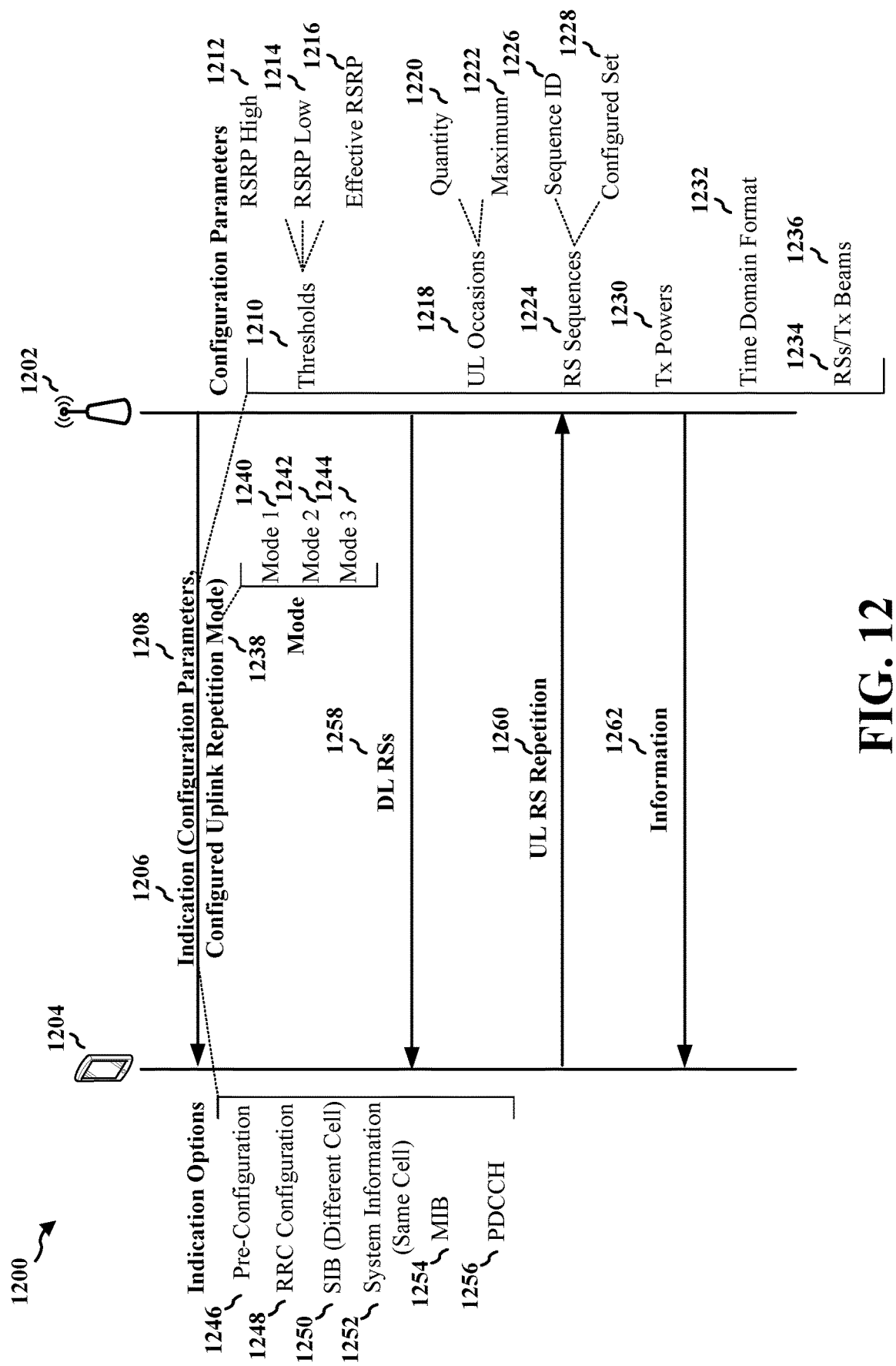
FIG. 12 is a diagram illustrating an example of a call flow between a base station and a UE.

FIG. 12 illustrates an example 1200 of a call flow between a base station 1202 and a UE 1204. Initially, the base station 1202 may provide an indication 1206 or configuration to the UE 1204 of configuration parameters 1208 for on-demand SSB, RMSI, or paging transmissions (or RACH monitoring). In one example, the configuration parameters 1208 may indicate one or more thresholds 1210 related to RSRP, such as an RSRP high threshold 1212, an RSRP low threshold 1214, an effective RSRP threshold 1216, or any combination of the foregoing. In one example, the configuration parameters 1208 may indicate information related to uplink occasions 1218 (e.g., uplink occasions 806, 1006, 1106), such as a quantity 1220 of uplink occasions associated with a given downlink reference signal (e.g., a value of K or M in mapping 815, 1015, 1115), a maximum quantity 1222 of uplink occasions in which the UE may transmit uplink reference signals (e.g., a value of k or m), and time-frequency resources of uplink occasions. In one example, the configuration parameters 1208 may indicate information related to reference signal sequences 1224, such as a sequence ID 1226 the UE is to apply to an uplink reference signal repetition, and a configured set 1228 of sequence IDs the UE is to apply to uplink reference signal repetitions associated with a same downlink reference signal. In one example, the configuration parameters 1208 may indicate information related to transmission powers 1230 (e.g., first transmission power 1124 and second transmission power 1126), such as a power setting for uplink reference signal repetitions (e.g., ramping rules). In one example, the configuration parameters 1208 may indicate time domain formats 1232 for uplink reference signal repetitions, such as quantities or locations of symbols in which uplink reference signal repetitions are transmitted in respective uplink occasions (e.g., same as or different than RACH preamble formats). In one example, the configuration parameters 1208 may indicate information related to downlink reference signals 1234 or transmission beams 1236 from base station 1202, such as which downlink reference signals or transmission beams the UE is to apply for uplink reference signal repetitions. The configuration parameters 1208 may indicate any combination of the foregoing.

The indication 1206 or configuration (or a different indication or configuration) may further include a configured uplink repetition mode 1238 for on-demand SSB, RMSI, or paging transmissions or RACH monitoring. For instance, the configured uplink repetition mode 1238 may indicate which type of mapping (e.g., mapping 815, 1015, 1115) the base station 1202 has configured between downlink reference signals (e.g., downlink reference signals 810, 1010, 1110) and uplink occasions (e.g., uplink occasions 806, 1006, 1106). For example, the configured uplink repetition mode may be a first mode 1240 indicating mapping 815 is applied or is to be applied, a second mode 1242 indicating mapping 1015 is applied or is to be applied, or a third mode 1244 indicating mapping 1115 is applied or is to be applied. The configured uplink repetition mode 1238 may correspondingly indicate whether the UE 1204 is to transmit uplink reference signal repetitions in uplink occasions associated with different transmission beams such as illustrated in FIG. 8 (e.g., in the first mode 1240), in uplink occasions associated with a same transmission beam such as illustrated in FIG. 10 (e.g., in the second mode 1242), or a combination of the foregoing such as illustrated in FIG. 11 (e.g., in the third mode 1244).

Additionally, the indication 1206 or configured uplink repetition mode 1238 may indicate whether the mapping or uplink reference signal repetitions in the first mode 1240, the second mode 1242, or the third mode 1244 (whichever may be applied) are beam-specific. For instance, referring to FIGS. 8, 10, and 11, the base station 802, 1002, 1102 may indicate or identify certain downlink reference signals 810, 1010, 1110 or transmission beams 812, 1012, 1112 that are associated with uplink occasions 806, 1006, 1106 in which the UE 804, 1004, 1104 may transmit uplink reference signal repetitions for on-demand SSB, RMSI, or paging transmission or RACH monitoring. For example, the base station 802, 1002, 1102 may indicate (via indication 1206) that the UE 804, 1004, 1104 is to apply (or refrain from applying) RSRP threshold comparisons or other rules for specific one(s) of downlink reference signals 810, 1010, 1110 or transmission beams 812, 1012, 1112, or that the UE is to transmit (or refrain from transmitting) uplink reference signal repetitions in uplink occasions 806, 1006, 1106 at specific time(s) of the times 808, 1008, 1108.

Furthermore, the base station 1202 may indicate to UE 1204 (e.g., via indication 1206, or via another indication or configuration) that the base station 1202 may perform beam refinement while the UE 1204 is sending uplink reference signal repetitions. For instance, in a variation of the example of FIG. 10, instead of the base station 1002 fixing its reception beam 1019 while the UE 1004 is transmitting uplink reference signal repetitions in uplink occasions 1006, the base station may perform reception beam refinement during this time. For example, the base station 1002 may sweep across narrower reception beams 1028 within wider reception beam 1019 such that the base station receives the uplink reference signal in uplink occasions 1006 respectively over different reception beams 1028. The base station 1002 may then check whichever reception beam 1028 resulted in the strongest received signal or RSRP, and apply the corresponding transmission beam 1022 for that strongest reception beam when transmitting information 1020. For example, if the UE transmits m=3 uplink reference signal repetitions in Times 2, 3, and 4 respectively, the base station may receive the repetitions respectively over different beams at Times 2, 3, 4 during beam refinement, and adjust its transmission beam 1022 for information 1020 accordingly.

In one example, the indication(s) 1206 or configuration(s) of configuration parameters 1208, the configured uplink repetition mode 1238, and base station beam refinement may be provided to UE 1204 semi-statically. In one example, the indication(s) 1206 may be provided in a pre-configuration 1246 associated with one or more types of downlink reference signals (e.g., KASs, SSBs, RMSI, PEIs, etc.). In one example, the base station 1202 may provide the indication 1206 to UE 1204 via a dedicated RRC configuration 1248 for on-demand SSB, RMSI, or paging transmissions (or RACH monitoring). In one example, the base station 1202 may provide the indication 1206 to UE 1204 via one or more SIB s 1250 from a different cell than that of base station 1202, such as one or more SIB s including other system information (OSI). In one example, the indication 1206 may be provided to UE 1204 via system information (SI 1252) of the same cell as base station 1202 (e.g., for PEI-R transmissions). In a further example, the base station 1202 may provide indication 1206 to UE 1204 via an MIB 1254. For instance, MIB 1254 may be an extended MIB (e.g., a five-symbol MIB including three PBCH symbols) where one of the PBCH symbols is utilized for indication 1206.

In another example, the indication 1206 or configuration(s) of configuration parameters 1208, the configured uplink repetition mode 1238, and base station beam refinement may be activated for UE 1204 dynamically, e.g., via a PDCCH 1256. For example, in a variation of examples 630 and 660 in FIGS. 6B and 6C for on-demand RMSI, the base station may configure DCI in one of the PDCCHs 636, 664 to schedule multiple (M) uplink occasions for ULT 638, 666 in a one-to-many mapping with SSB 634, 662 (such as illustrated in FIG. 10), and subsequently configure DCI in another one of the PDCCHs 636, 664 to schedule an uplink occasion for ULT 638, 666 in a one-to-one mapping with SSB 634, 662 (such as illustrated in FIG. 8). Thus, one PDCCH 1256 may activate one uplink repetition mode (e.g., the second mode 1242 or third mode 1244) for ULTs while another PDCCH 1256 may activate a different uplink repetition mode (e.g., the first mode 1240) for ULTs. Similarly, in a variation of example 700 in FIG. 7, the base station may configure a PEI in PDCCH in one of the PEI occasions 724 to activate one uplink repetition mode for PEI-Rs, and the base station may subsequently configure the PEI in PDCCH in another one of the PEI occasions 724 to activate a different uplink repetition mode for PEI-Rs. Additionally, the base station may dynamically change threshold(s) 1210 (and thus the RSRP comparison rules the UE is to apply for uplink reference signal repetitions) from one DCI or PEI in PDCCH 1256 to the next.

After the base station 1202 provides indication 1206 to UE 1204, or if the UE 1204 is otherwise configured for on-demand SSB, RMSI, or paging transmissions or RACH monitoring, the base station 1202 may transmit downlink reference signals 1258 (e.g., downlink reference signals 810, 1010, 1110) to the UE 1204. The downlink reference signals 1258 may be, for example, KASs 502, SSBs 506, 634, 662, a signal in PDCCH 636, 664, PEI 724, or other downlink signal associated with on-demand SSB, RMSI, or paging transmissions or RACH monitoring. In response to receiving one or more of the downlink reference signals 1258, the UE 1204 may transmit an uplink reference signal repetition 1260 in one or more uplink occasions (e.g., uplink occasions 806, 1006, 1106) associated with the downlink reference signal(s). The uplink reference signal repetition 1260 may be, for example, a ULT, a PEI-R, or another uplink signal associated with on-demand SSB, RMSI, or paging transmissions or RACH monitoring. For example, the UE may transmit the uplink reference signal repetition 1260 based on the configuration parameters 1208 and rules associated with the configured uplink repetition mode 1238. If the base station 1202 receives the uplink reference signal repetition 1260 (e.g., one or more times in associated uplink occasions), the base station 1202 may transmit information 1262 (e.g., information 820, 1020, 1120) to the UE 1204. The information 1262 may be for example, SSB 506, 634, 662, RMSI 508, 620, 642, 670, or paging message 714. The UE 1204 may then access the network of base station 1202 based on the information 1262.

Figure 13:
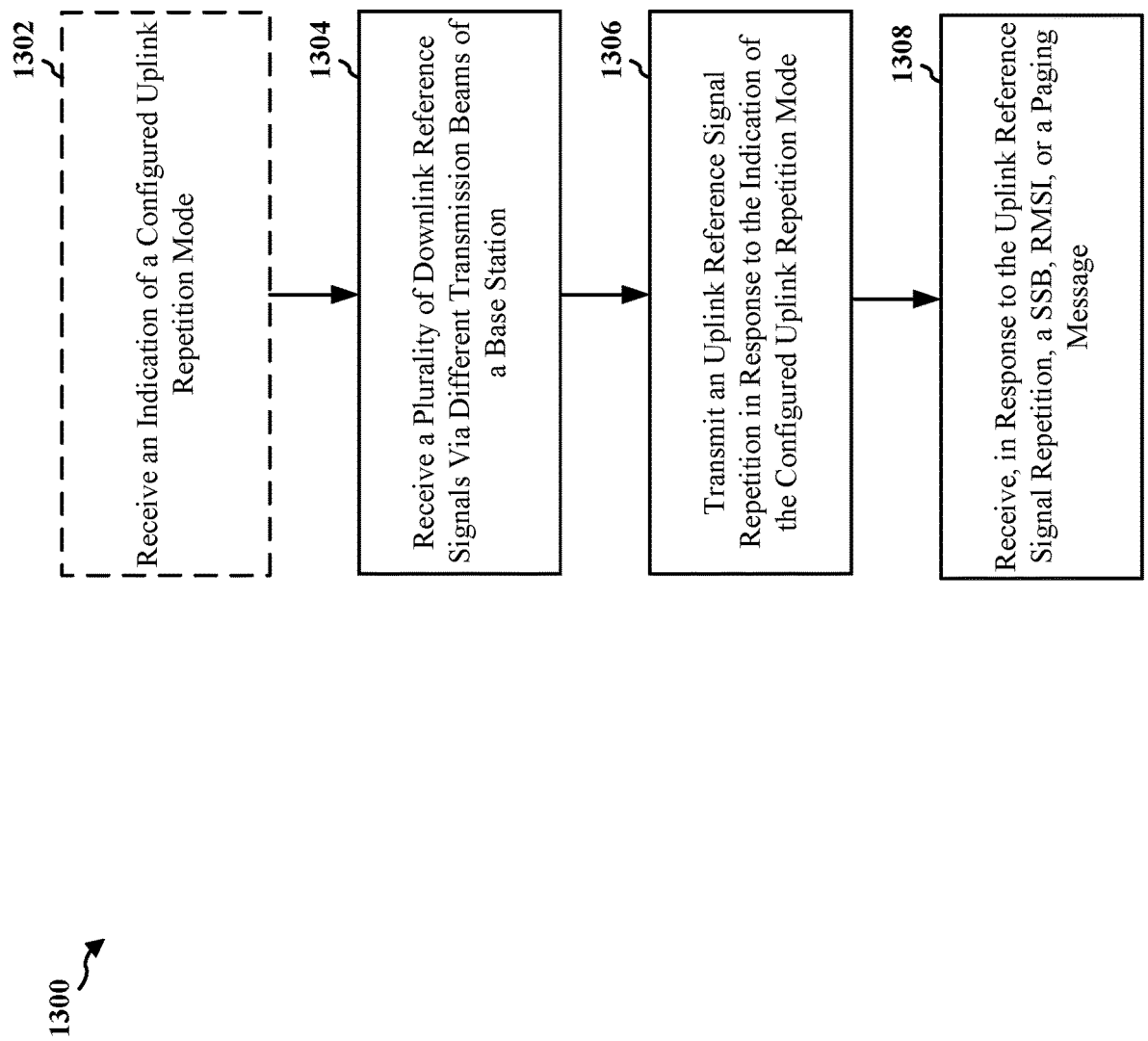
FIG. 13 is a flowchart of a method of wireless communication at a UE.

FIG. 13 is a flowchart 1300 of a method of wireless communication. The method may be performed by a UE (e.g., the UE 104, 350, 604, 704, 804, 902, 1004, 1104, 1204; the apparatus 1502). Optional aspects are illustrated in dashed lines. The method allows a UE to transmit repetitions of an ULT, PEI-R, or other uplink reference signal to a base station (e.g., the base station 102/180, 310, 602, 702, 802, 906, 1002, 1102, 1202) for on-demand SSB, RMSI, or paging transmissions (or for on-demand RACH monitoring) while balancing reliability of the uplink transmissions with network power consumption.

At 1302, the UE may receive an indication of a configured uplink repetition mode. For example, 1302 may be performed by indication component 1540. For instance, referring to FIG. 12, the UE 1204 may receive indication 1206 of configured uplink repetition mode 1238.

At 1304, the UE receives a plurality of downlink reference signals via different transmission beams of a base station. For example, 1304 may be performed by reference signal component 1542. For instance, referring to FIGS. 8, 10, 11, and 12, the UE 804, 1004, 1104, 1204 may receive downlink reference signals 810, 1010, 1110, 1258 from the base station 1202 respectively via different transmission beams 812, 1012, 1112. For example, the UE may receive one downlink reference signal via one transmission beam, another downlink reference signal via another transmission beam, and so forth.

At 1306, the UE may transmit an uplink reference signal repetition in response to the indication of the configured uplink repetition mode. For example, 1306 may be performed by repetition component 1544. The configured uplink repetition mode comprises a first mode in which the downlink reference signals (received at 1304) are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition. For instance, referring to FIG. 12, the UE 1204 may transmit uplink reference signal repetition 1260 in response to the indication 1206 of the configured uplink repetition mode 1238. For example, referring to FIGS. 8, 10, and 11, the UE 804, 1004, 1104 may transmit a repetition of a ULT, a PEI-R, or other uplink reference signal in one or more uplink occasions 806, 1006, 1106 associated with the downlink reference signal(s) 810, 1010, 1110 via the respective mapping 815, 1015, 1115 indicated in the configured uplink repetition mode. The configured uplink repetition mode 1238 may be one of multiple modes (e.g., first mode 1240, second mode 1242, or third mode 1244) indicating whether the downlink reference signals 810, 1258 are each associated with an individual uplink occasion 806 for the uplink reference signal repetition 1260 such as illustrated in FIG. 8 (the first mode 1240), whether one of the downlink reference signals 1010, 1258 is associated with multiple uplink occasions 1006 for the uplink reference signal repetition 1260 such as illustrated in FIG. 10 (the second mode 1242), or whether the downlink reference signals 1110, 1258 are each associated with at least two uplink occasions 1106 for the uplink reference signal repetition 1260 such as illustrated in FIG. 11 (the third mode 1244).

At 1308, the UE may receive, in response to the uplink reference signal repetition, a SSB, RMSI, or a paging message. For example, 1308 may be performed by information component 1546. The UE may also transmit a RACH preamble in response to the SSB. For instance, referring to FIGS. 8, 10, 11, and 12, the UE 804, 1004, 1104, 1204 may receive, in response to uplink reference signal repetition 1260, information 820, 1020, 1120, 1262 from base station 802, 1002, 1102, 1202. Referring as well to FIGS. 5, 6A-6C, and 7, the information 820, 1020, 1120, 1262 may be, for example, SSB 506, 634, 662, RMSI 508, 620, 642, 670, or paging message 714. The UE 1204 may then access the network of base station 1202 based on the information 1262 (e.g., in response to transmitting RACH preamble 510).

In a first approach, the uplink reference signal repetition may be transmitted in at least one of the individual uplink occasions associated with the downlink reference signals in response to the configured uplink repetition mode being the first mode. For instance, referring to FIGS. 8 and 12, in response to the configured uplink repetition mode 1238 being first mode 1240 (and thus mapping 815 being a one-to-one mapping between downlink reference signal 810, 1258 and uplink occasion 806), the UE 804, 1204 may transmit uplink reference signal repetition 1260 in at least one of the individual uplink occasions 806 associated with the downlink reference signals 810, 1258 (e.g., at Time 1, Time 3, Time 1 and Time 2, etc.).

In one example of the first approach, the uplink reference signal repetition may be transmitted in one of the individual uplink occasions associated with one of the downlink reference signals in response to the one of the downlink reference signals including a RSRP meeting a threshold. For instance, in one example rule, if the strongest downlink reference signal or transmission beam which is detected and measured by the UE includes an RSRP beyond an RSRP high threshold (e.g., if the UE detects multiple downlink reference signals associated with multiple transmission beams and one of the beams has a significantly high RSRP), the UE may send the repetition in the uplink occasion associated with that strongest beam. However, if the UE detects that multiple downlink reference signals or transmission beams include RSRPs exceeding the RSRP high threshold, the UE may flexibly send the repetition in the uplink occasion associated with any one of these strongest beams. For example, referring to FIG. 8, if the UE 804 measures the RSRPs 816 of the five downlink reference signals and determines that only RSRP 1 exceeds the RSRP high threshold, the UE may only transmit the uplink reference signal repetition in the associated uplink occasion 806 at Time 1. However, if the UE 804 determines that RSRP 1 and RSRP 2 both exceed the RSRP high threshold, the UE may select to transmit the uplink reference signal in the associated uplink occasion 806 either at Time 1 or Time 2.

In one example of the first approach, the uplink reference signal repetition may be transmitted in multiple ones of the individual uplink occasions associated with corresponding ones of the downlink reference signals in response to the corresponding ones of the downlink reference signals each including a RSRP meeting a first threshold and being below a second threshold. For instance, if the UE detects multiple downlink reference signals or transmission beams include an RSRP stronger than a RSRP low threshold but weaker than the RSRP high threshold (e.g., even the strongest beam, while not significantly strong, is still relatively strong over other beams), the UE may send multiple uplink reference signals in occasions respectively associated with even the weaker beams in order to achieve increased reliability and diversity. For instance, referring to FIG. 8, if the UE 804 determines that RSRP 1, RSRP 2, and RSRP 3 of associated downlink reference signals 810 all exceed the RSRP low threshold but do not meet the RSRP high threshold, the UE 804 may transmit the uplink reference signal in the associated uplink occasions 806 for each of these downlink reference signals at Time 1, Time 2, and Time 3 respectively.

In one example of the first approach, a maximum quantity of the multiple ones of the individual uplink occasions may be less than a quantity of the individual uplink occasions. For instance, as previously described if the UE detects multiple downlink reference signals or transmission beams include an RSRP stronger than a RSRP low threshold but weaker than the RSRP high threshold, the UE may send multiple uplink reference signals in occasions respectively associated with even the weaker beams in order to achieve increased reliability and diversity. However, under this rule, there may be a cap or limit (e.g., maximum quantity 1222) on the number of occasions K (e.g., quantity 1220) in which the UE may send the uplink reference signal (e.g., the strongest K=2 beams). Thus, in the example above, if the base station 802 configures a limit K=2 on the number of occasions allowed for uplink reference signal repetition, then the UE may transmit the uplink reference signal in only two of the associated uplink occasions at Time 1, Time 2, and Time 3 in this example.

In one example of the first approach, the uplink reference signal repetition may be transmitted in the multiple ones of the individual uplink occasions in response to a combination of the RSRPs of the corresponding ones of the downlink reference signals meeting a third threshold. For instance, the base station may configure a threshold for the UE to compare against a combined (an "effective") RSRP of multiple downlink reference signals when considering uplink occasions for uplink reference signal repetition. In contrast to the RSRP low threshold and RSRP high threshold previously described, this effective RSRP threshold may be a separate threshold (e.g., higher than the RSRP low threshold) which is not applied for individual beam or measurement comparisons but for multiple beam or measurements comparisons. The UE may obtain an effective RSRP of multiple downlink reference signals by combining their individual RSRPs (e.g., by summing the individual RSRPs in the linear domain). For instance, in the example of FIG. 8, if the UE 804 detects multiple downlink reference signals 810 via transmission beams 812 and measures RSRPs 816 for each detected signal, the UE may obtain an effective RSRP of the downlink reference signals by for example, performing a summation of the RSRPs 816 in the linear domain. After obtaining the effective RSRP, the UE 804 may compare this combined or effective RSRP against the configured, effective RSRP threshold to determine whether to transmit an uplink reference signal repetition in associated uplink occasions 806. For instance, if the combined RSRP of two of the downlink reference signals 810 (e.g., the summation of RSRP 1 and RSRP 2) exceed the effective RSRP threshold, the UE may transmit the uplink reference signal in the associated uplink occasions 806 (e.g., the occasions occurring at Time 1 and Time 2).

In one example of the first approach, the first threshold may be the RSRP of a reference signal at a location of a UE at which a transmission power of an associated uplink reference signal repetition is equivalent to a maximum transmission power of the UE. For instance, referring to FIG. 9, the UE may determine the RSRP low threshold to be the RSRP 916 of the downlink reference signal 904 observed by the UE 902 at the location 912 where the UE transmits the uplink signal at maximum transmission power 910 in order to meet the minimum target received power at the base station 906.

In one example of the first approach, the uplink reference signal repetition may be transmitted in one of the individual uplink occasions in a cell in response to a maximum RSRP of RSRPs of other downlink reference signals in a different cell being below a threshold. For example, referring to FIGS. 8 and 9, if the UE 804, 902 determines that even a maximum RSRP 918 of RSRPs 816, 920 observed from downlink reference signals 922 in a cell 924 is weaker than the RSRP low threshold, the UE may not transmit any uplink reference signals in the uplink occasions 806 within that cell since the UE may determine that this cell would be too weak to serve the UE adequately. Instead, the UE may check a different cell in the network (e.g., cell 926) and determine whether to transmit uplink reference signals in associated uplink occasions in response to RSRP comparisons of other downlink reference signals in that different cell.

In a second approach, the uplink reference signal repetition may be transmitted in at least one of the multiple uplink occasions in response to the configured uplink repetition mode being the second mode. For instance, referring to FIGS. 10 and 12, in response to the configured uplink repetition mode 1238 being second mode 1242 (and thus mapping 1015 being a one-to-many mapping between downlink reference signal 1010, 1258 and uplink occasions 1006), the UE 1004, 1204 may transmit uplink reference signal repetition 1260 in at least one of the multiple uplink occasions 1006 associated with the downlink reference signal 1010, 1258 (e.g., at Time 1, Time 3, Time 1 and Time 2, etc.).

In one example of the second approach, a quantity of the multiple uplink occasions in which the uplink reference signal repetition is transmitted may be based on a RSRP of the downlink reference signal. For instance, in the illustrated example of FIG. 10, the base station 1002 may configure the mapping 1015 such that downlink reference signal 1010 is associated with five uplink occasions (M=5). In turn, the UE may be configured to transmit its uplink reference signal in a quantity m of these M occasions (i.e., in m of M occasions, where m≤M). For instance, in the example of FIG. 10, the base station 1002 may configure the UE 1004 to transmit its uplink reference signal repetition in either one, two, three, four, or five of the uplink occasions 1006 (e.g., m=1, 2, 3, 4, or 5). The UE may select the quantity of m based on RSRP threshold comparisons or rules similar to those previously described with respect to FIG. 8. For instance, in the example of FIG. 10, the UE 1004 may transmit in one uplink occasion (m=1) if the RSRP 1016 exceeds the RSRP high threshold, the UE 1004 may transmit in two uplink occasions (m=2) if the RSRP 1016 does not meet the RSRP high threshold but exceeds a first threshold above the RSRP low threshold, the UE 1004 may transmit in three uplink occasions (m=3) if the RSRP 1016 does not meet the first threshold but exceeds a second threshold above the RSRP low threshold, and so forth (e.g., up to a limit on the value of m).

In one example of the second approach, the uplink reference signal repetition may be transmitted chronologically in the at least one of the multiple uplink occasions. For instance, in the examples of FIGS. 10 and 11, if the base station 1002, 1102 configures mapping 1015, 1115 such that one of the downlink reference signals 1010, 1110 is associated with four uplink occasions (M=4) and if the UE 1004, 1104 is configured to transmit an uplink reference signal in two of these four occasions (m=2), the UE may not arbitrarily select any two of these uplink occasions 1006, 1106 for the uplink signal but may chronologically select the first two occasions at Time 1 and Time 2.

In one example of the second approach, the downlink reference signal may be associated with a first transmission parameter, the SSB, the RMSI, or the paging message may be associated with a second transmission parameter different than the first transmission parameter, and the second transmission parameter may be responsive to a quantity of the multiple uplink occasions in which the uplink reference signal repetition is transmitted. For instance, in the examples of FIGS. 10 and 11, if the base station 1002, 1102 monitors four uplink occasions associated with a given downlink reference signal (M=4) and receives an uplink reference signal from multiple ones of UEs 1004, 1104 in the first three of these uplink occasions 1006, 1106 (m=3), the base station 1002, 1102 may determine that at least one of the UEs 1004, 1104 ended up transmitting three repetitions in order to satisfy the configured RSRP rules (e.g., due to being at the farthest coverage distance from the base station compared to other UEs). The base station may then take this information into account when sending information 1020 (e.g., the SSB, RMSI, or paging message) by modifying one or more transmission parameters (e.g., a modulation and coding scheme (MCS), PDCCH resources for RMSI, a transmission power, a RACH configuration, a number of repetitions of subsequent downlink signals to apply, etc.) accordingly. For instance, referring to FIG. 10, if the base station 1002 originally transmitted the downlink reference signal 1010 using a first transmission parameter 1024 (e.g., one MCS or Tx power), the base station may transmit the information 1020 using a second transmission parameter 1026 (e.g., a different MCS or Tx power) to account for the signal quality of the UE which ended up sending the most repetitions. For example, the base station may decrease the MCS or increase Tx power of information 1020 to accommodate the weakest UE. Later, if the base station receives an uplink reference signal from multiple UEs in less uplink occasions (e.g., the first two occasions or m=2), the base station may determine that the weakest UE has become stronger and therefore may increase the MCS or decrease the Tx power accordingly.

In one example of the second approach, a reference signal sequence of the uplink reference signal repetition may be responsive to a quantity of the multiple uplink occasions in which the uplink reference signal repetition is transmitted. For instance, the base station may configure a different waveform for an uplink reference signal (e.g., a different sequence identifier, cyclic shift, etc.) for different quantities of uplink occasions or reference signals. For instance, referring to FIGS. 10 and 11, if the UE 1004, 1104 is configured to transmit an uplink reference signal repetition in m=1, 2, 3, 4, or 5 uplink occasions, the base station 1002, 1102 may configure the UE 1004, 1104 to apply a different sequence, cyclic shift, or other parameter to its uplink reference signal repetitions for different values of m. For example, the UE may transmit uplink reference signal repetitions using one sequence ID or cyclic shift for its repetition if m=1, a second sequence ID or cyclic shift for each of its repetitions if m=2, a third sequence ID or cyclic shift for each of its repetitions if m=3, and so forth.

In one example of the second approach, each of the multiple uplink occasions in which the uplink reference signal repetition is transmitted may be associated with a different transmission power for the uplink reference signal repetition. For instance, the base station may configure the UE to apply different transmission powers to uplink reference signal repetitions in respective uplink occasions associated with a same downlink reference signal or transmission beam. For example, in the example of FIG. if the base station 1002 configures mapping 1015 such that one of the downlink reference signals 1010 is associated with five uplink occasions (M=5), and if the UE 1004 is configured to transmit a repetition in one, two, three, four, or five of these uplink occasions (m=1, 2, 3, 4, or 5), then the UE may further be configured to apply a different transmission power to its uplink reference signal in each of the uplink occasions 1006. For instance, the UE 1004 may ramp its transmission power for each mth repetition such that a higher Tx power is applied in each successive uplink occasion (e.g., Time 1 corresponds to an initial Tx power, Time 2 corresponds to a higher Tx power, Time 3 corresponds to an even higher Tx power, and so forth).

In one example of the second approach, each of the multiple uplink occasions in which the uplink reference signal repetition is transmitted may be associated with a different time domain format for the uplink reference signal repetition. For instance, the base station may configure the UE to apply different formats to its uplink reference signal repetitions in uplink occasions associated with a same downlink reference signal or transmission beam. For instance, referring to the example of FIG. 10, the base station 1002 may configure the UE 1004 to transmit an uplink reference signal in the uplink occasion 1006 at Time 1 using one format, in the uplink occasion 1006 at Time 2 using a different format, and so forth. The uplink reference signal format here may indicate, for example, a quantity of symbols for the reference signal, a time domain location for the reference signal, a sequence identifier for the reference signal, or other information. Moreover, the uplink reference signal format may be the same as or similar to a RACH preamble format, or the uplink reference signal format may be a different format. For instance, again referring to the example of FIG. 10, if the UE 1004 is configured to transmit a repetition in m=1, 2, 3, 4, or 5 uplink occasions associated with a single downlink reference signal, the uplink reference signal at each successive uplink occasion may have a longer format than in the previous uplink occasion. Thus, an uplink reference signal at Time 1 may have an initial format, the uplink reference signal at Time 2 may have a longer format, the uplink reference signal at Time 3 may have an even longer format, and so forth.

In one example of the second approach, each of the multiple uplink occasions in which the uplink reference signal repetition is transmitted may be associated with a different reference signal sequence identifier for the uplink reference signal repetition, and the different reference signal sequence identifiers may be from a configured set of sequence identifiers associated with a quantity of the multiple uplink occasions in which the uplink reference signal repetition is transmitted. For instance, the base station may configure the UE to apply a different waveform (e.g., a sequence ID) to each of its uplink reference signal repetitions associated with a same downlink reference signal or transmission beam. The sequence IDs may be taken from a set of sequence IDs out of multiple, preconfigured or configured sets of sequence IDs. For instance, referring to FIG. 10, if the UE 1004 is configured to transmit m=1, 2, 3, 4, or 5 repetitions in uplink occasions 1006 associated with a same downlink reference signal 1010, the base station 1002 may configure the UE 1004 to apply a different sequence for each mth repetition or uplink occasion in a set of configured or preconfigured sequences based on the order of sequences in the set. As an example, if the UE 1004 is configured to apply a given set {Sequence A, Sequence B, Sequence C} for m=3 repetitions in the uplink occasions 1006 associated with one of the downlink reference signals 1010, then the UE 1004 may transmit the first repetition at Time 1 using Sequence A, the second repetition at Time 2 using Sequence B, and the third repetition at Time 3 using Sequence C. This approach provides diversity in the code-domain and interference randomization. Moreover, different sets of sequence IDs may be pre-configured or configured for different quantities of repetitions (different values of m). For instance, in the example of FIG. 10, if the UE 1004 transmits three repetitions (m=3), the UE may apply the set {Sequence A, Sequence B, Sequence C} such as previously described, while if the UE 1104 transmits two repetitions (m=2), the UE may apply a different set {Sequence D, Sequence E} for its repetitions in a similar manner.

In a third approach, the uplink reference signal repetition may be transmitted in one or more occasions of the at least two uplink occasions for at least one of the downlink reference signals in response to the configured uplink repetition mode being the third mode. For instance, referring to FIGS. 11 and 12, in response to the configured uplink repetition mode 1238 being third mode 1244 (and thus mapping 1115 being a many-to-many mapping between downlink reference signals 1110, 1258 and uplink occasions 1106), the UE 1104, 1204 may transmit uplink reference signal repetition 1260 in at least one of the multiple uplink occasions 1106 respectively associated with at least one of the downlink reference signals 1110, 1258 (e.g., at Time 1, at Time 6, at Time 1 and Time 6, etc.).

In one example of the third approach, a first quantity of the downlink reference signals associated with uplink occasions in which the uplink reference signal repetition is transmitted may be based on RSRPs of the downlink reference signals, and a second quantity of the uplink occasions in which the uplink reference signal repetition is transmitted may be based on a corresponding RSRP of an associated downlink reference signal. For instance, where the base station configures multiple mappings between downlink reference signals and uplink occasions in the time domain, the UE may further be configured to transmit its uplink reference signal in uplink occasions associated with a quantity n of N downlink reference signals or transmission beams, as well as in the quantity m of M occasions associated with each downlink reference signal or transmission beam. For instance, in the illustrated example of FIG. 11, if the UE 1104 receives five reference signals from base station 1102 via different transmission beams 1112, then for one, two, three, four, or five of these downlink reference signals 1110 (n=1, 2, 3, 4, or 5), the UE may transmit an uplink reference signal repetition in up to one, two, three, four, or five uplink occasions associated with an nth RS or beam (m=1, 2, 3, 4, or 5). The UE may select the values of n and m based on RSRPs of reference signals, time locations of reference signals or associated occasions, or rules similar to those previously described with respect to FIGS. 8-10. For instance, in the example of FIG. 11, the UE 1104 may transmit in uplink occasion(s) 1106 associated with one downlink reference signal (n=1) if the RSRP 1116 of that reference signal exceeds the RSRP high threshold, the UE may transmit in uplink occasion(s) 1106 associated with two downlink reference signals (n=2) if the RSRPs 1116 of those reference signals each individually do not meet the RSRP high threshold but exceed the RSRP low threshold or if the effective RSRP of those reference signals exceed the effective RSRP threshold, and so forth (e.g., up to a limit on the value of n). Then, for each nth reference signal or beam, the UE 1104 may transmit in one uplink occasion (m=1) if the RSRP 1116 of the nth RS exceeds the RSRP high threshold, the UE 1104 may transmit in two uplink occasions (m=2) if the RSRP 1116 of the nth RS does not meet the RSRP high threshold but exceeds a first threshold above the RSRP low threshold, the UE 1104 may transmit in three uplink occasions (m=3) if the RSRP 1116 of the nth RS does not meet the first threshold but exceeds a second threshold above the RSRP low threshold, and so forth (e.g., up to a limit on the value of m).

In one example of the third approach, the uplink reference signal repetition may be transmitted with a first transmission power in a last uplink occasion of uplink occasions associated with a first downlink reference signal, the uplink reference signal repetition may be transmitted with a second transmission power in an initial uplink occasion of other uplink occasions associated with a second downlink reference signal subsequent to the first downlink reference signal, and the second transmission power may be less than the first transmission power. For instance, referring to the example of FIG. 11 where the base station 1102 configures multiple mappings 1115 of downlink reference signals 1110 to uplink occasions 1106, the UE 1104 may ramp its Tx power in the uplink occasions 1106 associated with one downlink reference signal from Time 1 to Time 5 (similar to the example of FIG. 10), but the UE 1104 may not continue ramping its Tx power even higher in the uplink occasions 1106 associated with another downlink reference signal from Time 6 to Time 10. Instead, after the UE 1104 ramps or increases its Tx power to a first transmission power 1124 at Time 5, the UE 1104 decreases or resets its Tx power back to an initial state or second transmission power 1126 beginning at Time 6. The UE 1104 may afterward again ramp its Tx power from Time 6 to Time 10, and continue ramping and resetting its Tx power similarly for other uplink occasions associated with different downlink reference signals.

In one example of any of the foregoing approaches, the uplink occasions in which the uplink reference signal repetition is transmitted in a cell may be associated with configuration parameters indicated in: a pre-configuration, a RRC configuration, a SIB in a different cell, system information in the cell, a PDCCH, or a MIB. For instance, referring to FIG. 12, in one example, the indication(s) 1206 of configuration parameters 1208 may be provided in a pre-configuration 1246 associated with one or more types of downlink reference signals (e.g., KASs, SSBs, RMSI, PEIs, etc.). In another example, the base station 1202 may provide the indication 1206 to UE 1204 via a dedicated RRC configuration 1248 for on-demand SSB, RMSI, or paging transmissions (or RACH monitoring). In another example, the base station 1202 may provide the indication 1206 to UE 1204 via one or more SIB s 1250 from a different cell than that of base station 1202, such as one or more SIB s including OSI. In another example, the indication 1206 may be provided to UE 1204 via system information (SI 1252) of the same cell as base station 1202 (e.g., for PEI-R transmissions). In a further example, the base station 1202 may provide indication 1206 to UE 1204 via an MIB 1254. For instance, MIB 1254 may be an extended MIB (e.g., a five-symbol MIB including three PBCH symbols) where one of the PBCH symbols is utilized for indication 1206. In another example, the indication 1206 or configuration(s) of configuration parameters 1208 may be activated for UE 1204 dynamically, e.g., via a PDCCH 1256.

In one example of any of the foregoing approaches, the indication received at 1302 may identify one or more of the downlink reference signals associated with respective transmission beams of the base station, and the configured uplink repetition mode may be associated with the one or more downlink reference signals identified in the indication. For instance, referring to FIG. 12, the indication 1206 or configured uplink repetition mode 1238 may indicate whether the mapping or uplink reference signal repetitions in the first mode 1240, the second mode 1242, or the third mode 1244 (whichever may be applied) are beam-specific. For instance, referring to FIGS. 8, 10, and 11, the base station 802, 1002, 1102 may indicate or identify certain downlink reference signals 810, 1010, 1110 or transmission beams 812, 1012, 1112 that are associated with uplink occasions 806, 1006, 1106 in which the UE 804, 1004, 1104 may transmit uplink reference signal repetitions for on-demand SSB, RMSI, or paging transmission or RACH monitoring. For example, the base station 802, 1002, 1102 may indicate (via indication 1206) that the UE 804, 1004, 1104 is to apply (or refrain from applying) RSRP threshold comparisons or other rules for specific one(s) of downlink reference signals 810, 1010, 1110 or transmission beams 812, 1012, 1112, or that the UE is to transmit (or refrain from transmitting) uplink reference signal repetitions in uplink occasions 806, 1006, 1106 at specific time(s) of the times 808, 1008, 1108.

In one example of any of the foregoing approaches, the SSB, the RMSI, or the paging message may be received in a refined transmission beam of the base station narrower than one of the different transmission beams for the downlink reference signals. For instance, in a variation of the example of FIG. 10, instead of the base station 1002 fixing its reception beam 1019 while the UE 1004 is transmitting uplink reference signal repetitions in uplink occasions 1006, the base station may perform reception beam refinement during this time. For example, the base station 1002 may sweep across narrower reception beams 1028 within wider reception beam 1019 such that the base station receives the uplink reference signal in uplink occasions 1006 respectively over different reception beams 1028. The base station 1002 may then check whichever reception beam 1028 resulted in the strongest received signal or RSRP, and apply the corresponding transmission beam 1022 for that strongest reception beam when transmitting information 1020. For example, if the UE transmits m=3 uplink reference signal repetitions in Times 2, 3, and 4 respectively, the base station may receive the repetitions respectively over different beams at Times 2, 3, 4 during beam refinement, and adjust its transmission beam 1022 for information 1020 accordingly. The UE may then receive information 1020 (e.g., the SSB, RMSI, or paging message) via the adjusted transmission beam of the base station.

Figure 14:
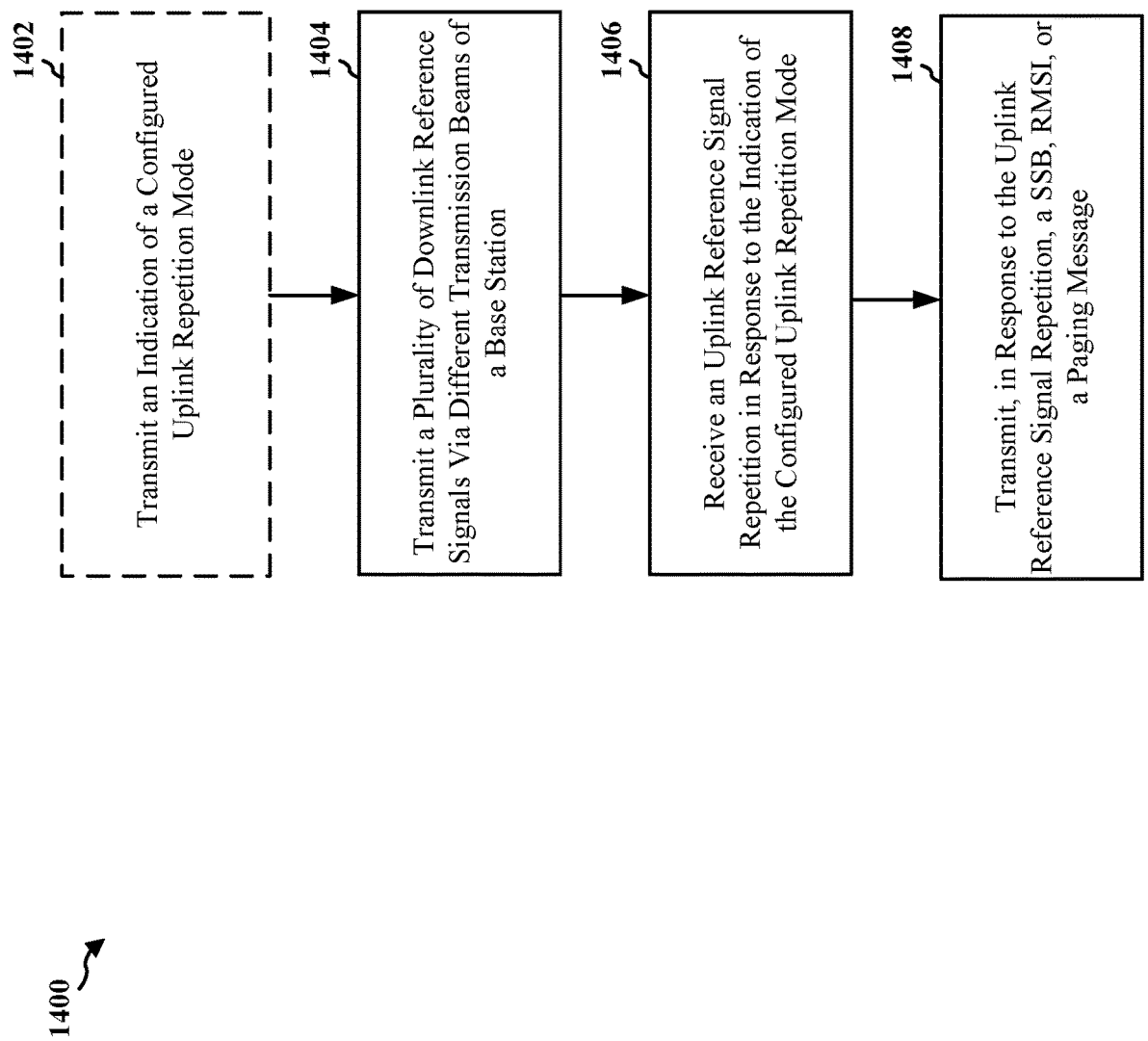
FIG. 14 is a flowchart of a method of wireless communication at a base station.

FIG. 14 is a flowchart 1400 of a method of wireless communication. The method may be performed by a base station (e.g., the base station 102/180, 310, 602, 702, 802, 906, 1002, 1102, 1202; the apparatus 1602). Optional aspects are illustrated in dashed lines. The method allows a base station to receive repetitions of an ULT, PEI-R, or other uplink reference signal from a UE (e.g., the UE 104, 350, 604, 704, 804, 902, 1004, 1104, 1204; the apparatus 1502) and to subsequently provide on-demand SSB, RMSI, or paging transmissions (or for on-demand RACH monitoring) while balancing reliability of the uplink transmissions with network power consumption.

At 1402, the base station may transmit an indication of a configured uplink repetition mode. For example, 1402 may be performed by indication component 1640. For instance, referring to FIG. 12, the base station 1202 may transmit indication 1206 of configured uplink repetition mode 1238.

At 1404, the base station transmits a plurality of downlink reference signals via different transmission beams of a base station. For example, 1404 may be performed by reference signal component 1642. For instance, referring to FIGS. 8, 10, 11, and 12, the base station 802, 1002, 1102, 1202 may transmit downlink reference signals 810, 1010, 1110, 1258 to the UE 1204 respectively via different transmission beams 812, 1012, 1112. For example, the base station may transmit one downlink reference signal via one transmission beam, another downlink reference signal via another transmission beam, and so forth.

At 1406, the base station may receive an uplink reference signal repetition in response to the indication of the configured uplink repetition mode. For example, 1406 may be performed by repetition component 1644. The configured uplink repetition mode comprises a first mode in which the downlink reference signals (transmitted at 1404) are each associated with an individual uplink occasion for the uplink reference signal repetition, a second mode in which one of the downlink reference signals is associated with multiple uplink occasions for the uplink reference signal repetition, or a third mode in which the downlink reference signals are each associated with at least two uplink occasions for the uplink reference signal repetition. For instance, referring to FIG. 12, the base station 1202 may receive uplink reference signal repetition 1260 in response to the indication 1206 of the configured uplink repetition mode 1238. For example, referring to FIGS. 8, 10, and 11, the base station 802, 1002, 1102 may receive a repetition of a ULT, a PEI-R, or other uplink reference signal in one or more uplink occasions 806, 1006, 1106 associated with the downlink reference signal(s)

810, 1010, 1110 via the respective mapping 815, 1015, 1115 indicated in the configured uplink repetition mode. The configured uplink repetition mode 1238 may be one of multiple modes (e.g., first mode 1240, second mode 1242, or third mode 1244) indicating whether the downlink reference signals 810, 1258 are each associated with an individual uplink occasion 806 for the uplink reference signal repetition 1260 such as illustrated in FIG. 8 (the first mode 1240), whether one of the downlink reference signals 1010, 1258 is associated with multiple uplink occasions 1006 for the uplink reference signal repetition 1260 such as illustrated in FIG. 10 (the second mode 1242), or whether the downlink reference signals 1110, 1258 are each associated with at least two uplink occasions 1106 for the uplink reference signal repetition 1260 such as illustrated in FIG. 11 (the third mode 1244).

At 1408, the base station may transmit, in response to the uplink reference signal repetition, a SSB, RMSI, or a paging message. For example, 1408 may be performed by information component 1646. The base station may also receive a RACH preamble in response to the SSB. For instance, referring to FIGS. 8, 10, 11, and 12, the base station 802, 1002, 1102, 1202 may transmit, in response to uplink reference signal repetition 1260, information 820, 1020, 1120, 1262 to UE 804, 1004, 1104, 1204. Referring as well to FIGS. 5, 6A-6C, and 7, the information 820, 1020, 1120, 1262 may be, for example, SSB 506, 634, 662, RMSI 508, 620, 642, 670, or paging message 714. The UE 1204 may then access the network of base station 1202 based on the information 1262 (e.g., in response to the base station receiving RACH preamble 510 from the UE).

In a first approach, the uplink reference signal repetition may be received in at least one of the individual uplink occasions associated with the downlink reference signals in response to the configured uplink repetition mode being the first mode. For instance, referring to FIGS. 8 and 12, in response to the configured uplink repetition mode 1238 being first mode 1240 (and thus mapping 815 being a one-to-one mapping between downlink reference signal 810, 1258 and uplink occasion 806), the base station 802, 1202 may receive uplink reference signal repetition 1260 in at least one of the individual uplink occasions 806 associated with the downlink reference signals 810, 1258 (e.g., at Time 1, Time 3, Time 1 and Time 2, etc.).

In a second approach, the uplink reference signal repetition may be received in at least one of the multiple uplink occasions in response to the configured uplink repetition mode being the second mode. For instance, referring to FIGS. 10 and 12, in response to the configured uplink repetition mode 1238 being second mode 1242 (and thus mapping 1015 being a one-to-many mapping between downlink reference signal 1010, 1258 and uplink occasions 1006), the base station 1002, 1202 may receive uplink reference signal repetition 1260 in at least one of the multiple uplink occasions 1006 associated with the downlink reference signal 1010, 1258 (e.g., at Time 1, Time 3, Time 1 and Time 2, etc.).

In a third approach, the uplink reference signal repetition may be received in one or more occasions of the at least two uplink occasions for at least one of the downlink reference signals in response to the configured uplink repetition mode being the third mode. For instance, referring to FIGS. 11 and 12, in response to the configured uplink repetition mode 1238 being third mode 1244 (and thus mapping 1115 being a many-to-many mapping between downlink reference signals 1110, 1258 and uplink occasions 1106), the base station 1102, 1202 may receive uplink reference signal repetition 1260 in at least one of the multiple uplink occasions 1106 respectively associated with at least one of the downlink reference signals 1110, 1258 (e.g., at Time 1, at Time 6, at Time 1 and Time 6, etc.).

Figure 15:
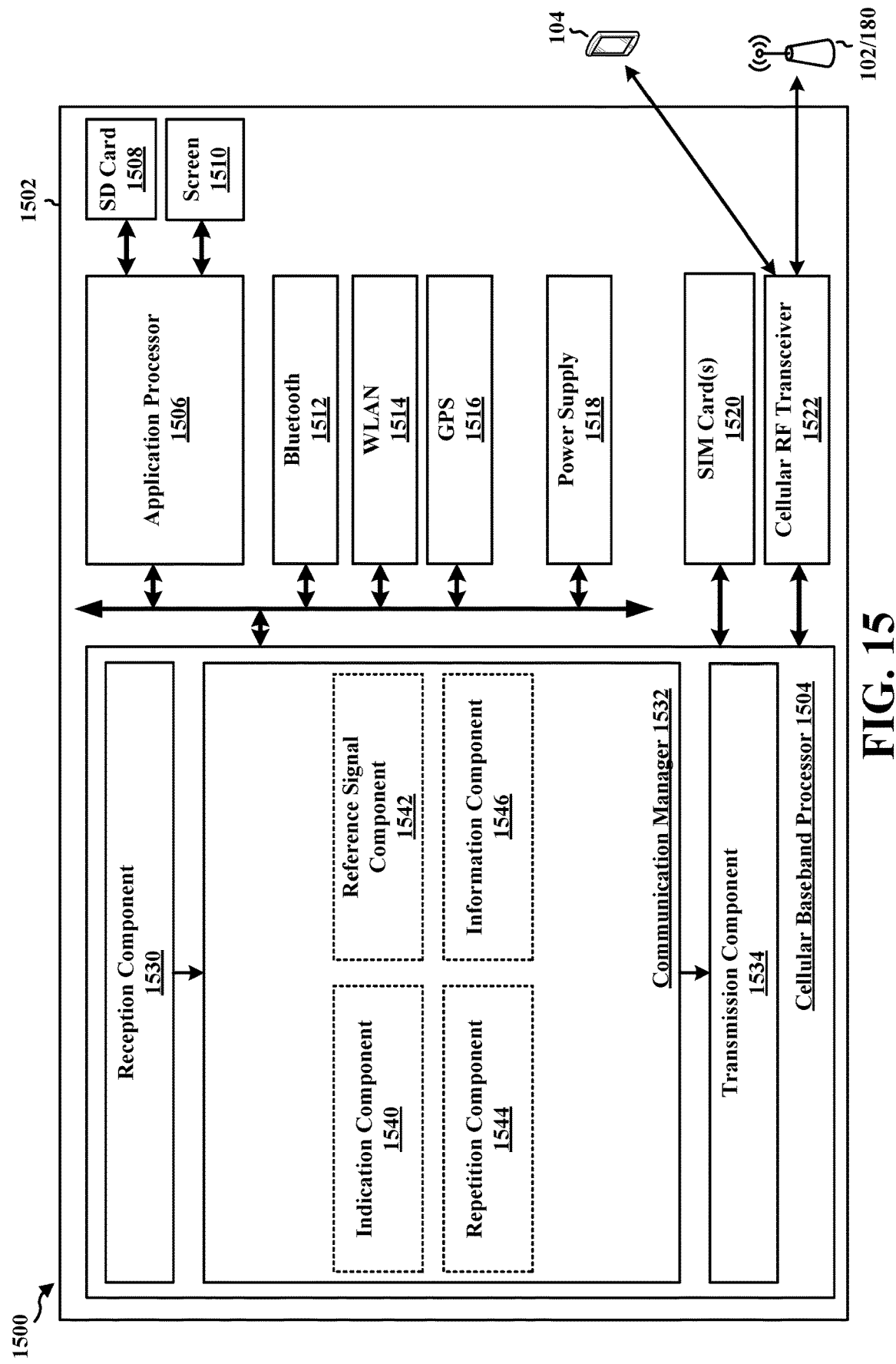
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes an indication component 1540 that is configured to receive an indication of a configured uplink repetition mode, e.g., as described in connection with 1302. The communication manager 1532 further includes a reference signal component 1542 that is configured to receive a plurality of downlink reference signals via different transmission beams of a base station, e.g., as described in connection with 1304. The communication manager 1532 further includes a repetition component 1544 that is configured to transmit an uplink reference signal repetition in response to the indication of the configured uplink repetition mode, e.g., as described in connection with 1306. The communication manager 1532 further includes an information component 1546 that is configured to receive, in response to the uplink reference signal repetition, a SSB, RMSI, or a paging message, e.g., as described in connection with 1308.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving a plurality of downlink reference signals via different transmission beams of a base station, and means for transmitting an uplink reference signal repetition in response to the indication of the configured uplink repetition mode, where the means for receiving is further configured to receive, in response to the uplink reference signal repetition, a SSB, RMSI, or a paging message.

In one configuration, the apparatus 1502, and in particular the cellular baseband processor 1504, may include means for receiving an indication of a configured uplink repetition mode.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
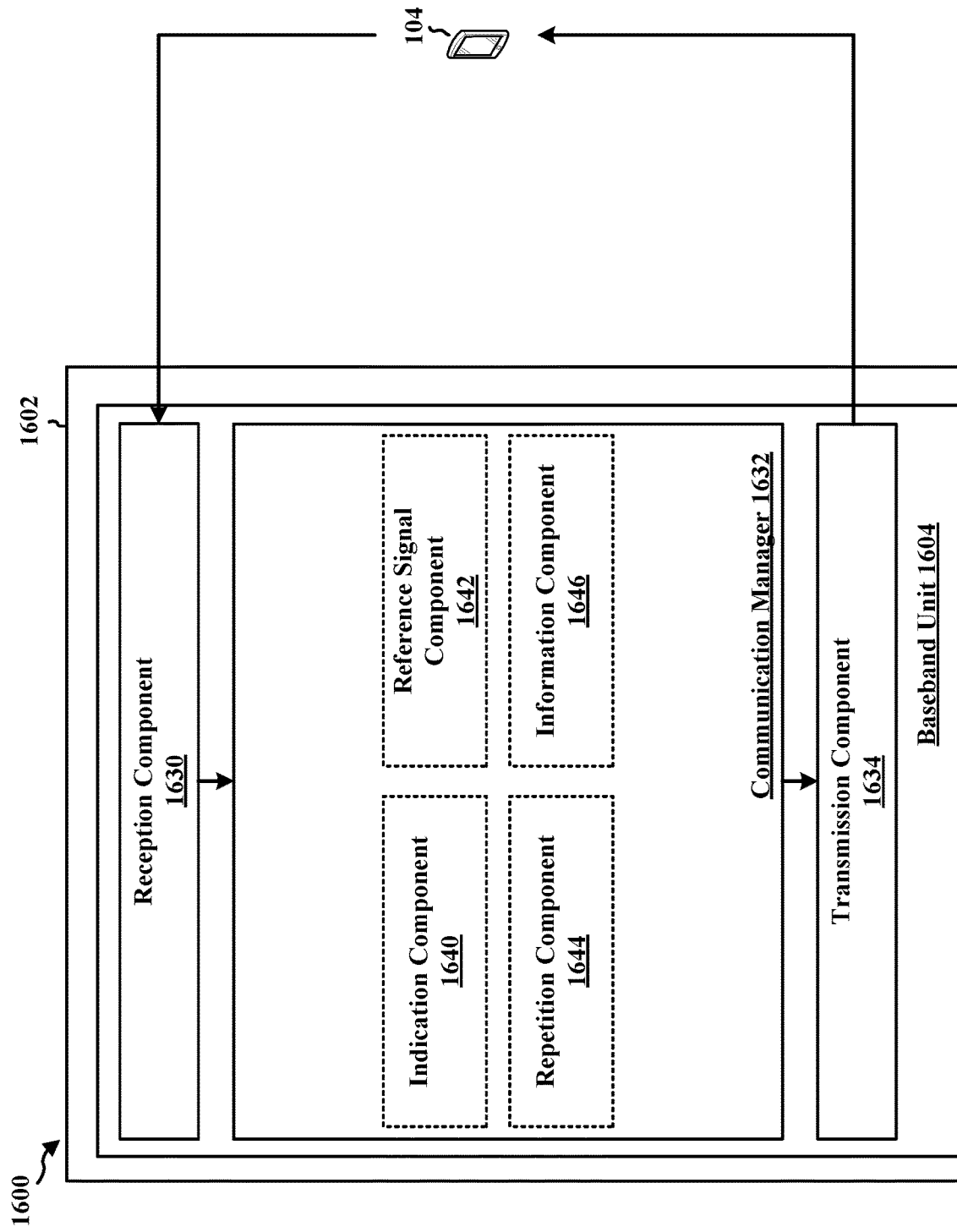
FIG. 16 is a diagram illustrating another example of a hardware implementation for another example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes an indication component 1640 that is configured to transmit an indication of a configured uplink repetition mode, e.g., as described in connection with 1402. The communication manager 1632 further includes a reference signal component 1642 that is configured to transmit a plurality of downlink reference signals via different transmission beams, e.g., as described in connection with 1404. The communication manager 1632 further includes a repetition component 1644 that is configured to receive an uplink reference signal repetition in response to the indication of the configured uplink repetition mode, e.g., as described in connection with 1406. The communication manager 1532 further includes an information component 1646 that is configured to transmit, in response to the uplink reference signal repetition, a SSB, RMSI, or a paging message, e.g., as described in connection with 1408.

The apparatus may include additional components that perform each of the blocks of the algorithm in the aforementioned flowcharts of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting a plurality of downlink reference signals via different transmission beams of a base station, and means for receiving an uplink reference signal repetition in response to the indication of the configured uplink repetition mode, where the means for transmitting is further configured to transmit, in response to the uplink reference signal repetition, a SSB, RMSI, or a paging message.

In one configuration, the apparatus 1602, and in particular the baseband unit 1604, may include means for transmitting an indication of a configured uplink repetition mode.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects are provided which allow a UE to transmit repetitions of an ULT, PEI-R, or other uplink reference signal to a base station for on-demand SSB, RMSI, or paging transmissions (or for on-demand RACH monitoring). A base station may configure rules for a UE to follow when transmitting repetitions of an uplink reference signal in uplink occasions occurring at different times. These rules may diversely apply to different types of mappings, including a one-to-one mapping between downlink reference signals and uplink occasions (e.g., uplink occasions are associated with different transmission beams of the base station), a one-to-many mapping between a downlink reference signal and the uplink occasions (e.g., uplink occasions are associated with a same transmission beam of the base station), or multiple mappings between downlink reference signals and uplink occasions (e.g., one set of uplink occasions is associated with one beam, another set of uplink occasions is associated with a different beam, etc.). The base station may configure these rules, mappings, and other related parameters semi-statically or dynamically. If the UE receives one or more of these downlink reference signals via one or more transmission beams of the base station, the UE may measure an RSRP of each received reference signal, compare the RSRPs against one or more configured thresholds, and transmit repetition(s) of the uplink reference signal in one or more of the uplink occasions based on the measurements and configured rules applying these thresholds. As a result, the base station may successfully decode the uplink signal and subsequently provide on-demand SSBs, RMSI, or paging messages, or perform on-demand RACH monitoring, providing a balance between network energy savings and uplink reference signal reliability or diversity.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication, comprising: a processor; memory coupled with the processor; and instructions stored in the memory and operable, when executed by the processor, to cause the apparatus to: receive a plurality of downlink reference signals via different transmission beams of a base station; transmit an uplink reference signal repetition in response to an indication of a configured uplink repetition mode, the configured uplink repetition mode comprising: a first mode in which the downlink reference signals are each associated with an individual uplink occasion for the uplink reference signal repetition; a second mode in which one of the downlink reference signals is associated with multiple uplink occasions for the uplink reference signal repetition; or a third mode in which the downlink reference signals are each associated with at least two uplink occasions for the uplink reference signal repetition; and receive, in response to the uplink reference signal repetition, a synchronization signal block (SSB), remaining minimum system information (RMSI), or a paging message.

Example 2 is the apparatus of Example 1, wherein the uplink reference signal repetition is transmitted in at least one of the individual uplink occasions associated with the downlink reference signals in response to the configured uplink repetition mode being the first mode.

Example 3 is the apparatus of Example 2, wherein the uplink reference signal repetition is transmitted in one of the individual uplink occasions associated with one of the downlink reference signals in response to the one of the downlink reference signals including a reference signal received power (RSRP) meeting a threshold.

Example 4 is the apparatus of Example 2, wherein the uplink reference signal repetition is transmitted in multiple ones of the individual uplink occasions associated with corresponding ones of the downlink reference signals in response to the corresponding ones of the downlink reference signals each including a reference signal received power (RSRP) meeting a first threshold and being below a second threshold.

Example 5 is the apparatus of Example 4, wherein a maximum quantity of the multiple ones of the individual uplink occasions is less than a quantity of the individual uplink occasions.

Example 6 is the apparatus of Examples 4 or 5, wherein the uplink reference signal repetition is transmitted in the multiple ones of the individual uplink occasions in response to a combination of the RSRPs of the corresponding ones of the downlink reference signals meeting a third threshold.

Example 7 is the apparatus of any of Examples 4 to 6, wherein the first threshold is the RSRP of a reference signal at a location of a user equipment (UE) at which a transmission power of an associated uplink reference signal repetition is equivalent to a maximum transmission power of the UE.

Example 8 is the apparatus of any of Examples 2 to 7, wherein the uplink reference signal repetition is transmitted in one of the individual uplink occasions in a cell in response to a maximum reference signal received power (RSRP) of RSRPs of other downlink reference signals in a different cell being below a threshold.

Example 9 is the apparatus of Example 1, wherein the uplink reference signal repetition is transmitted in at least one of the multiple uplink occasions in response to the configured uplink repetition mode being the second mode.

Example 10 is the apparatus of Example 9, wherein a quantity of the multiple uplink occasions in which the uplink reference signal repetition is transmitted is based on a reference signal received power (RSRP) of the one of the downlink reference signals.

Example 11 is the apparatus of Examples 9 or 10, wherein the uplink reference signal repetition is transmitted chronologically in the at least one of the multiple uplink occasions.

Example 12 is the apparatus of any of Examples 9 to 11, wherein the one of the downlink reference signals is associated with a first transmission parameter; wherein the SSB, the RMSI, or the paging message is associated with a second transmission parameter different than the first transmission parameter; and wherein the second transmission parameter is responsive to a quantity of the multiple uplink occasions in which the uplink reference signal repetition is transmitted.

Example 13 is the apparatus of any of Examples 9 to 12, wherein a reference signal sequence of the uplink reference signal repetition is responsive to a quantity of the multiple uplink occasions in which the uplink reference signal repetition is transmitted.

Example 14 is the apparatus of any of Examples 9 to 13, wherein each of the multiple uplink occasions in which the uplink reference signal repetition is transmitted is associated with a different transmission power for the uplink reference signal repetition.

Example 15 is the apparatus of any of Examples 9 to 14, wherein each of the multiple uplink occasions in which the uplink reference signal repetition is transmitted is associated with a different time domain format for the uplink reference signal repetition.

Example 16 is the apparatus of any of Examples 9 to 15, wherein each of the multiple uplink occasions in which the uplink reference signal repetition is transmitted is associated with a different reference signal sequence identifier for the uplink reference signal repetition; and wherein the different reference signal sequence identifiers are from a configured set of sequence identifiers associated with a quantity of the multiple uplink occasions in which the uplink reference signal repetition is transmitted.

Example 17 is the apparatus of Example 1, wherein the uplink reference signal repetition is transmitted in one or more occasions of the at least two uplink occasions for at least one of the downlink reference signals in response to the configured uplink repetition mode being the third mode.

Example 18 is the apparatus of Example 17, wherein a first quantity of the downlink reference signals associated with uplink occasions in which the uplink reference signal repetition is transmitted is based on reference signal received powers (RSRPs) of the downlink reference signals; and wherein a second quantity of the uplink occasions in which the uplink reference signal repetition is transmitted is based on a corresponding RSRP of an associated downlink reference signal.

Example 19 is the apparatus of Examples 17 or 18, wherein the uplink reference signal repetition is transmitted with a first transmission power in a last uplink occasion of uplink occasions associated with a first downlink reference signal; wherein the uplink reference signal repetition is transmitted with a second transmission power in an initial uplink occasion of other uplink occasions associated with a second downlink reference signal subsequent to the first downlink reference signal; and wherein the second transmission power is less than the first transmission power.

Example 20 is the apparatus of any of Examples 1 to 19, wherein the uplink occasions in which the uplink reference signal repetition is transmitted in a cell are associated with configuration parameters indicated in: a pre-configuration; a radio resource control (RRC) configuration; a system information block (SIB) in a different cell; system information (SI) in the cell; a physical downlink control channel (PDCCH); or a master information block (MIB).

Example 21 is the apparatus of any of Examples 1 to 20, wherein the instructions, when executed by the processor, further cause the apparatus to: receive the indication of the configured uplink repetition mode.

Example 22 is the apparatus of Example 21, wherein the indication identifies one or more of the downlink reference signals associated with respective transmission beams of the base station; and wherein the configured uplink repetition mode is associated with the one or more downlink reference signals identified in the indication.

Example 23 is the apparatus of any of Examples 1 to 22, wherein the SSB, the RMSI, or the paging message is received in a refined transmission beam of the base station narrower than one of the different transmission beams for the downlink reference signals.

Example 24 is an apparatus for wireless communication, comprising: a processor; memory coupled with the processor; and instructions stored in the memory and operable, when executed by the processor, to cause the apparatus to: transmit a plurality of downlink reference signals via different transmission beams; receive an uplink reference signal repetition in response to an indication of a configured uplink repetition mode, the configured uplink repetition mode comprising: a first mode in which the downlink reference signals are each associated with an individual uplink occasion for the uplink reference signal repetition; a second mode in which one of the downlink reference signals is associated with multiple uplink occasions for the uplink reference signal repetition; or a third mode in which the downlink reference signals are each associated with at least two uplink occasions for the uplink reference signal repetition; and transmit, in response to the uplink reference signal repetition, a synchronization signal block (SSB), remaining minimum system information (RMSI), or a paging message.

Example 25 is the apparatus of Example 24, wherein the uplink reference signal repetition is received in at least one of the individual uplink occasions associated with the downlink reference signals in response to the configured uplink repetition mode being the first mode.

Example 26 is the apparatus of Example 24, wherein the uplink reference signal repetition is received in at least one of the multiple uplink occasions in response to the configured uplink repetition mode being the second mode.

Example 27 is the apparatus of Example 24, wherein the uplink reference signal repetition is received in one or more occasions of the at least two uplink occasions for at least one of the downlink reference signals in response to the configured uplink repetition mode being the third mode.

Example 28 is the apparatus of any of Examples 24 to 27, wherein the instructions, when executed by the processor, further cause the apparatus to: transmit the indication of the configured uplink repetition mode.

Example 29 is a method of wireless communication of a user equipment (UE), comprising: receiving a plurality of downlink reference signals via different transmission beams of a base station; transmitting an uplink reference signal repetition in response to an indication of a configured uplink repetition mode, the configured uplink repetition mode comprising: a first mode in which the downlink reference signals are each associated with an individual uplink occasion for the uplink reference signal repetition; a second mode in which one of the downlink reference signals is associated with multiple uplink occasions for the uplink reference signal repetition; or a third mode in which the downlink reference signals are each associated with at least two uplink occasions for the uplink reference signal repetition; and receiving, in response to the uplink reference signal repetition, a synchronization signal block (SSB), remaining minimum system information (RMSI), or a paging message.

Example 30 is a method of wireless communication of a base station, comprising: transmitting a plurality of downlink reference signals via different transmission beams; receiving an uplink reference signal repetition in response to an indication of a configured uplink repetition mode, the configured uplink repetition mode comprising: a first mode in which the downlink reference signals are each associated with an individual uplink occasion for the uplink reference signal repetition; a second mode in which one of the downlink reference signals is associated with multiple uplink occasions for the uplink reference signal repetition; or a third mode in which the downlink reference signals are each associated with at least two uplink occasions for the uplink reference signal repetition; and transmitting, in response to the uplink reference signal repetition, a synchronization signal block (SSB), remaining minimum system information (RMSI), or a paging message.

What is claimed is:

1. An apparatus for wireless communication, comprising:
   a processor;
   memory coupled with the processor; and
   instructions stored in the memory and operable, when executed by the processor, to cause the apparatus to:
      receive a plurality of downlink reference signals via different transmission beams of a base station;
      transmit an uplink reference signal repetition in response to an indication of a configured uplink repetition mode, the configured uplink repetition mode comprising:
         a first mode in which the downlink reference signals are each associated with an individual uplink occasion for the uplink reference signal repetition;
         a second mode in which one of the downlink reference signals is associated with multiple uplink occasions for the uplink reference signal repetition; or
         a third mode in which the downlink reference signals are each associated with at least two uplink occasions for the uplink reference signal repetition; and
      receive, in response to the uplink reference signal repetition, a synchronization signal block (SSB), remaining minimum system information (RMSI), or a paging message.

2. The apparatus of claim 1, wherein the uplink reference signal repetition is transmitted in at least one of the individual uplink occasions associated with the downlink reference signals in response to the configured uplink repetition mode being the first mode.

3. The apparatus of claim 2, wherein the uplink reference signal repetition is transmitted in one of the individual uplink occasions associated with one of the downlink reference signals in response to the one of the downlink reference signals including a reference signal received power (RSRP) meeting a threshold.

4. The apparatus of claim 2, wherein the uplink reference signal repetition is transmitted in multiple ones of the individual uplink occasions associated with corresponding ones of the downlink reference signals in response to the corresponding ones of the downlink reference signals each including a reference signal received power (RSRP) meeting a first threshold and being below a second threshold.

5. The apparatus of claim 4, wherein a maximum quantity of the multiple ones of the individual uplink occasions is less than a quantity of the individual uplink occasions.

6. The apparatus of claim 4, wherein the uplink reference signal repetition is transmitted in the multiple ones of the individual uplink occasions in response to a combination of the RSRPs of the corresponding ones of the downlink reference signals meeting a third threshold.

7. The apparatus of claim 4, wherein the first threshold is the RSRP of a reference signal at a location of a user equipment (UE) at which a transmission power of an associated uplink reference signal repetition is equivalent to a maximum transmission power of the UE.

8. The apparatus of claim 2, wherein the uplink reference signal repetition is transmitted in one of the individual uplink occasions in a cell in response to a maximum reference signal received power (RSRP) of RSRPs of other downlink reference signals in a different cell being below a threshold.

9. The apparatus of claim 1, wherein the uplink reference signal repetition is transmitted in at least one of the multiple uplink occasions in response to the configured uplink repetition mode being the second mode.

10. The apparatus of claim 9, wherein a quantity of the multiple uplink occasions in which the uplink reference signal repetition is transmitted is based on a reference signal received power (RSRP) of the one of the downlink reference signals.

11. The apparatus of claim 9, wherein the uplink reference signal repetition is transmitted chronologically in the at least one of the multiple uplink occasions.

12. The apparatus of claim 9,
    wherein the one of the downlink reference signals is associated with a first transmission parameter;
    wherein the SSB, the RMSI, or the paging message is associated with a second transmission parameter different than the first transmission parameter; and
    wherein the second transmission parameter is responsive to a quantity of the multiple uplink occasions in which the uplink reference signal repetition is transmitted.

13. The apparatus of claim 9, wherein a reference signal sequence of the uplink reference signal repetition is responsive to a quantity of the multiple uplink occasions in which the uplink reference signal repetition is transmitted.

14. The apparatus of claim 9, wherein each of the multiple uplink occasions in which the uplink reference signal repetition is transmitted is associated with a different transmission power for the uplink reference signal repetition.

15. The apparatus of claim 9, wherein each of the multiple uplink occasions in which the uplink reference signal repetition is transmitted is associated with a different time domain format for the uplink reference signal repetition.

16. The apparatus of claim 9,
    wherein each of the multiple uplink occasions m which the uplink reference signal repetition is transmitted is associated with a different reference signal sequence identifier for the uplink reference signal repetition; and
    wherein the different reference signal sequence identifiers are from a configured set of sequence identifiers associated with a quantity of the multiple uplink occasions in which the uplink reference signal repetition is transmitted.

17. The apparatus of claim 1, wherein the uplink reference signal repetition is transmitted in one or more occasions of the at least two uplink occasions for at least one of the downlink reference signals in response to the configured uplink repetition mode being the third mode.

18. The apparatus of claim 17,
    wherein a first quantity of the downlink reference signals associated with uplink occasions in which the uplink reference signal repetition is transmitted is based on reference signal received powers (RSRPs) of the downlink reference signals; and wherein a second quantity of the uplink occasions in which the uplink reference signal repetition is transmitted is based on a corresponding RSRP of an associated downlink reference signal.

19. The apparatus of claim 17,
wherein the uplink reference signal repetition is transmitted with a first transmission power in a last uplink occasion of uplink occasions associated with a first downlink reference signal;
wherein the uplink reference signal repetition is transmitted with a second transmission power in an initial uplink occasion of other uplink occasions associated with a second downlink reference signal subsequent to the first downlink reference signal; and
wherein the second transmission power is less than the first transmission power.

20. The apparatus of claim 1, wherein the uplink occasions in which the uplink reference signal repetition is transmitted in a cell are associated with configuration parameters indicated in:
a pre-configuration;
a radio resource control (RRC) configuration;
a system information block (SIB) in a different cell;
system information (SI) in the cell;
a physical downlink control channel (PDCCH); or
a master information block (MIB).

21. The apparatus of claim 1, wherein the instructions, when executed by the processor, further cause the apparatus to:
receive the indication of the configured uplink repetition mode.

22. The apparatus of claim 21,
wherein the indication identifies one or more of the downlink reference signals associated with respective transmission beams of the base station; and
wherein the configured uplink repetition mode is associated with the one or more downlink reference signals identified in the indication.

23. The apparatus of claim 1, wherein the SSB, the RMSI, or the paging message is received in a refined transmission beam of the base station narrower than one of the different transmission beams for the downlink reference signals.

24. An apparatus for wireless communication, comprising:
a processor;
memory coupled with the processor; and
instructions stored in the memory and operable, when executed by the processor, to cause the apparatus to:
transmit a plurality of downlink reference signals via different transmission beams;
receive an uplink reference signal repetition in response to an indication of a configured uplink repetition mode, the configured uplink repetition mode comprising:
a first mode in which the downlink reference signals are each associated with an individual uplink occasion for the uplink reference signal repetition;
a second mode in which one of the downlink reference signals is associated with multiple uplink occasions for the uplink reference signal repetition; or
a third mode in which the downlink reference signals are each associated with at least two uplink occasions for the uplink reference signal repetition; and
transmit, in response to the uplink reference signal repetition, a synchronization signal block (SSB), remaining minimum system information (RMSI), or a paging message.

25. The apparatus of claim 24, wherein the uplink reference signal repetition is received in at least one of the individual uplink occasions associated with the downlink reference signals in response to the configured uplink repetition mode being the first mode.

26. The apparatus of claim 24, wherein the uplink reference signal repetition is received in at least one of the multiple uplink occasions in response to the configured uplink repetition mode being the second mode.

27. The apparatus of claim 24, wherein the uplink reference signal repetition is received in one or more occasions of the at least two uplink occasions for at least one of the downlink reference signals in response to the configured uplink repetition mode being the third mode.

28. The apparatus of claim 24, wherein the instructions, when executed by the processor, further cause the apparatus to:
transmit the indication of the configured uplink repetition mode.

29. A method of wireless communication of a user equipment (UE), comprising:
receiving a plurality of downlink reference signals via different transmission beams of a base station;
transmitting an uplink reference signal repetition m response to an indication of a configured uplink repetition mode, the configured uplink repetition mode comprising:
a first mode in which the downlink reference signals are each associated with an individual uplink occasion for the uplink reference signal repetition;
a second mode in which one of the downlink reference signals is associated with multiple uplink occasions for the uplink reference signal repetition; or
a third mode in which the downlink reference signals are each associated with at least two uplink occasions for the uplink reference signal repetition; and
receiving, in response to the uplink reference signal repetition, a synchronization signal block (SSB), remaining minimum system information (RMSI), or a paging message.

30. A method of wireless communication of a base station, comprising:
transmitting a plurality of downlink reference signals via different transmission beams;
receiving an uplink reference signal repetition in response to an indication of a configured uplink repetition mode, the configured uplink repetition mode comprising:
a first mode in which the downlink reference signals are each associated with an individual uplink occasion for the uplink reference signal repetition;
a second mode in which one of the downlink reference signals is associated with multiple uplink occasions for the uplink reference signal repetition; or
a third mode in which the downlink reference signals are each associated with at least two uplink occasions for the uplink reference signal repetition; and transmitting, in response to the uplink reference signal repetition, a synchronization signal block (SSB), remaining minimum system information (RMSI), or a paging message.

\* \* \* \* \*